United States Patent
Tanase et al.

(10) Patent No.: US 6,520,533 B2
(45) Date of Patent: Feb. 18, 2003

(54) HEAD PROTECTING AIR BAG APPARATUS

(75) Inventors: Toshinori Tanase, Aichi-ken (JP); Takashi Yamamoto, Aichi-ken (JP); Norio Urushi, Toyota (JP); Mitsuyoshi Ohno, Anjo (JP)

(73) Assignees: Toyoda Gosei Co., Ltd., Aichi-ken (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/748,147

(22) Filed: Dec. 27, 2000

(65) Prior Publication Data
US 2001/0006287 A1 Jul. 5, 2001

(30) Foreign Application Priority Data
Dec. 27, 1999 (JP) ............................................ 11-371120

(51) Int. Cl.$^7$ ............................................... B60R 21/22
(52) U.S. Cl. .................................. 280/730.2; 280/743.1
(58) Field of Search ............................ 280/728.2, 730.1, 280/730.2, 743.1, 743.2, 728.3

(56) References Cited

U.S. PATENT DOCUMENTS

| | | | |
|---|---|---|---|
| 5,265,903 A | 11/1993 | Kuretake et al. | 280/730 |
| 5,462,308 A | 10/1995 | Seki et al. | 280/749 |
| 5,755,457 A | 5/1998 | Specht | 280/728.2 |
| 5,788,270 A | 8/1998 | HÅland et al. | 280/729 |
| 5,791,683 A | 8/1998 | Shibata et al. | 280/730.2 |
| 5,884,937 A | 3/1999 | Yamada | 280/730.2 |
| 6,082,761 A | * 7/2000 | Kato et al. | 280/728.2 |
| 6,129,377 A | * 10/2000 | Okumura et al. | 280/730.2 |
| 6,234,517 B1 | * 5/2001 | Miyahara et al. | 280/730.2 |
| 6,296,269 B1 | * 10/2001 | Nagai et al. | 280/728.2 |
| 6,302,434 B2 | * 10/2001 | Nakajima et al. | 280/730.1 |
| 6,305,707 B1 | * 10/2001 | Ishiyama et al. | 280/728.2 |

FOREIGN PATENT DOCUMENTS

| | | |
|---|---|---|
| GB | 2 261 636 A | 5/1993 |
| JP | 6-227340 | 8/1994 |
| JP | 09-249089 | 9/1997 |
| JP | 11-321532 | 11/1999 |

* cited by examiner

Primary Examiner—Paul N. Dickson
Assistant Examiner—Faye M. Fleming
(74) Attorney, Agent, or Firm—Pillsbury Winthrop LLP

(57) ABSTRACT

A head protecting air bag apparatus includes a lid and an air bag. The lid is disposed at an upper edge side periphery of an opening at a vehicle's inner side in a vehicle body and at an upper portion of a pillar portion. The air bag is attached to the vehicle's inner side of the vehicle body, is housed at a vehicle's outer side position of the lid in a folded state, and pushes and opens the lid to cover the opening when unfolding and expansion is caused by inflow of gas for expansion. The air bag is folded so that a lower edge side approaches an upper edge side, and an attachment portion at the upper edge side is attached to the vehicle body so that the air bag is housed at the vehicle's outer side of the lid. A part of a lower end of the lid is disposed at a vehicle's outer side of an upper end of a pillar garnish covering a vehicle's inner side of the pillar portion. A part of the air bag at a position where the lower end of the lid is disposed at the vehicle's outer side of the upper end of the pillar garnish has a more intensified force to push and open the lid than another part. In the head protecting air bag apparatus of the invention, when the air bag is unfolded and expanded, the lower end of the lid disposed at the vehicle's outer side of the upper end of the pillar garnish easily gets over the upper end of the pillar garnish. Then the air bag is smoothly unfolded and expanded.

10 Claims, 32 Drawing Sheets

Fig. 6
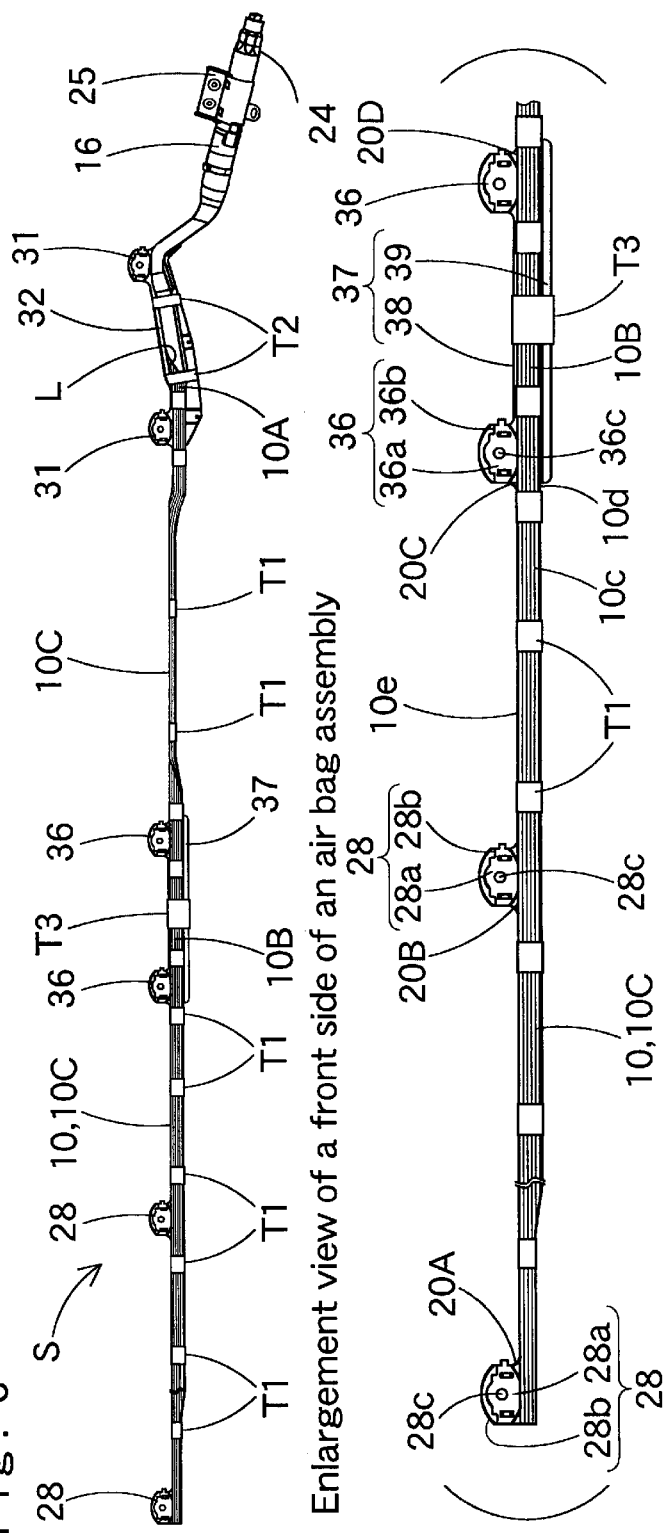
Enlargement view of a front side of an air bag assembly
Enlargement view of a rear side of an air bag assembly
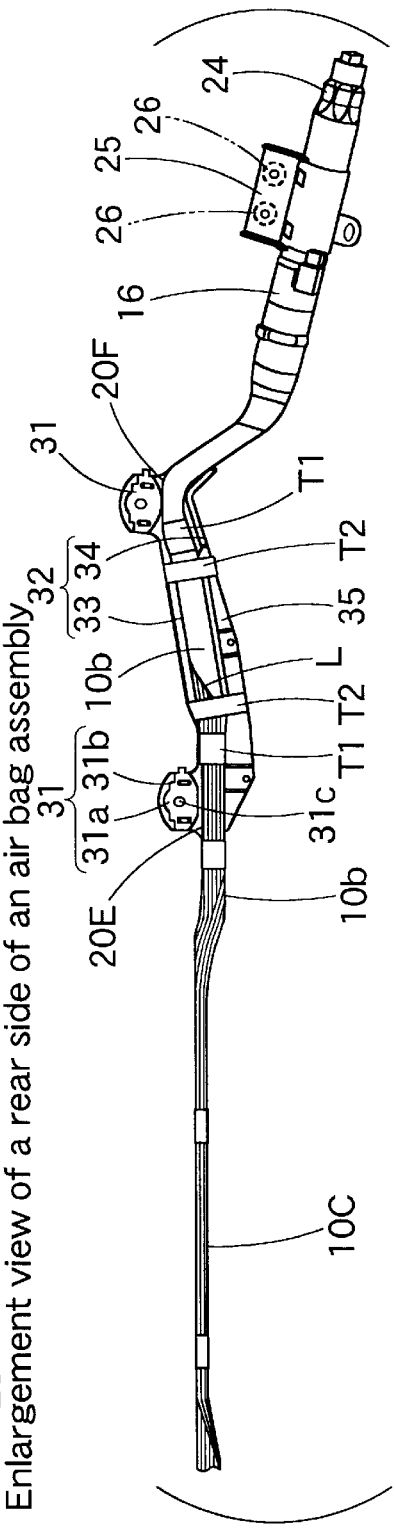

Fig. 10
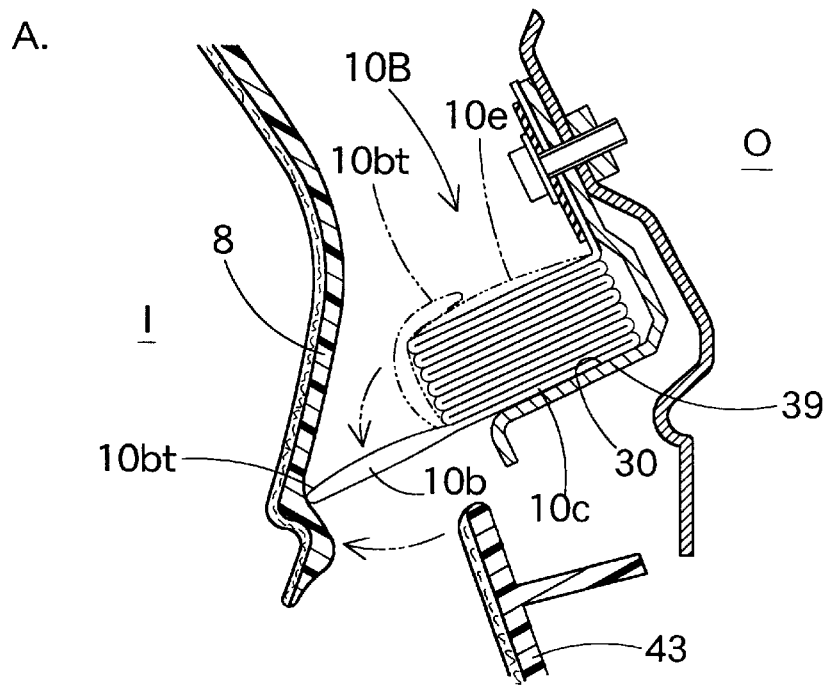
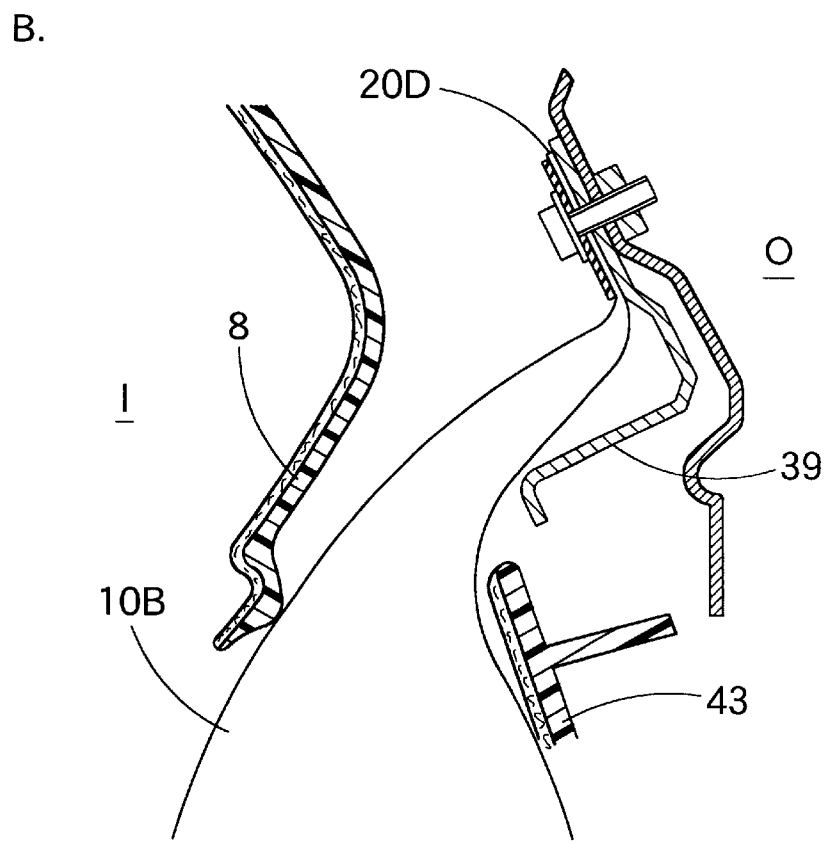

HEAD PROTECTING AIR BAG APPARATUS

BACKGROUND OF THE INVENTION

1. Field of the Invention

The present invention relates to a head protecting air bag apparatus mounted in a vehicle. The air bag of the invention covers a portion of the inside of the vehicle when it unfolds and expands.

2. Description of Related Art

Conventional head protecting air bag apparatuses such as the ones disclosed in Japanese Patent Unexamined Publication No. Hei. 11-321532 are known. The air bags of this type is folded and housed in the upper edge side periphery of the vehicle's inner side opening and extends over a front pillar portion/roof side rail portion of a vehicle body. A lid exists at the upper edge side of the vehicle's inner side opening.

When this kind of air bag deploys, it opens the lid by pushing outward and covers the vehicle's inner side opening. An attachment portion exists at the upper edge side of the air bag and allows the airbag to attach to the vehicle body. Further, the air bag is folded so that its lower edge side is next to its upper edge side. The attachment portion attaches to the vehicle body, so that the air bag is housed at the vehicle's outer side of the lid (rear side of the lid).

The lid exists above a center pillar portion and a rear pillar portion in such a manner that it extends in the longitudinal direction of the vehicle. When the lid is pushed by the expanding air bag, it opens while its bottom is moved toward the inside of the vehicle. A pillar garnish for covering the inside of the vehicle is disposed at the pillar portion. The lower end of the lid is disposed at the vehicle's outer side of the upper end of the pillar garnish.

Thus, when the expanding air bag pushes the lid the lid is hard to open at the position of the pillar portion because, at this position, the lower end of the lid gets over the upper end of the pillar garnish and is moved to the vehicle's inner side, and the lid meets resistance. As a result, the air bag unfolds later at the location of the pillar portion than that at the other locations.

A restraining member exists at the upper position of the pillar portion. To prevent the unfolded and expanded air bag from intruding into the vehicle's outer side of the pillar garnish. This restraining member is structured by a part with a substantially L-shaped section, including a vertical wall portion and a horizontal wall portion extending from the lower end of the vertical wall portion to the vehicle's inner side. The vertical wall portion supports the vehicle's outer side of the folded air bag. The horizontal wall portion supports the lower end side of the folded air bag.

However, if the restraining member is disposed over the pillar portion, there is a case where a part of the air bag disposed at the position of the restraining member is caught by the horizontal wall portion when the air bag unfolds and expands. In that case, the air bag unfolds at the location of the pillar portion later than at other locations.

SUMMARY OF THE INVENTION

An object of the present invention is to address the above problems. More specifically, an object of the present invention is to provide a head protecting air bag apparatus in which the air bag unfolds at the location of a pillar portion quickly.

Further, another object of the present invention is to provide a head protecting air bag apparatus in which even if a restraining member is located at the pillar portion, the air bag will quickly unfold at that location.

The object of the present invention is achieved by a head protecting air bag apparatus having the following structure. The head protecting air bag apparatus includes a lid and an air bag. The lid exists at the periphery of the upper edge side of the vehicle's inner side opening and at the upper part of the pillar portion. The air bag is attached to the vehicle's inner side and is housed on the vehicle's outer side position of the lid in a folded state. When the gas flows into the airbag, it unfolds and expands by pushing and opening the lid. The air bag includes a lower edge, an upper edge, and an attachment portion at the upper edge for attachment to the vehicle body. The air bag is folded so that the lower edge approaches the upper edge, and the attachment portion is attached to the vehicle's body so that it is housed at the vehicle's outer side of the lid. A part of a lower end of the lid is disposed at a vehicle's outer side of the upper end of a pillar garnish covering a vehicle's inner side of the pillar portion.

In the head protecting air bag apparatus, the part of the air bag positioned at the lower end of the lid and at the vehicle's outer side of the upper end of the pillar garnish, the lid pushing part, pushes more forcefully than other parts of the air bag in order to push the lid open. Thus, when the air bag unfolds and expands, the lower end of the lid easily gets over the upper end of the pillar garnish. As a result, the part of the air bag at the pillar portion quickly expands. Accordingly, the whole air bag smoothly unfolds and covers the vehicle's inside opening.

The part of the air bag that pushes and opens the lid can be formed by twisting this part from the rest of the air bag so that this part unfolds and expands in the direction toward the lid.

When the air bag is in a non-expansion and flat unfolded state and is then folded in a bellows fold, in which it is folded substantially in a vertical direction from the lower edge side to the upper edge side, the lid pushing part of the air bag can be formed by twisting this part from the other part of the air bag so that a folding direction is directed toward the lid.

When the lid pushing part of the air bag is formed by twisting this part from the rest of the air bag, the desired structure is achieved. That is, a restraining member for preventing the air bag at the time of unfolding and expansion from intruding into the vehicle's outer side of the pillar garnish exists at the upper position of the pillar portion. The restraining member has a guide surface so that the lid pushing part of the air bag is directed toward the lid when the air bag unfolds and expands. The lower end side of the guide surface is directed toward an upper side of a vehicle's inner side parting portion between the lower end of the lid and the upper end of the pillar garnish. The air bag in the non-extension and flat unfolded state is folded in the bellows fold. The lid pushing part of the air bag is housed at the vehicle's outer side of the lid while its folding direction is made parallel to the guide surface and supported by the guide surface.

In this case, when the air bag unfolds and expands, the lid pushing part unfolds along the guide surface of the restraining member toward the vehicle's inner side, and can properly push and open the lid. Thus, the part of the air bag at the pillar portion unfolds more quickly. That is, the whole air bag unfolds more smoothly to cover the vehicle's inner side opening.

The restraining member may be formed integrally with the vehicle body.

Besides, the restraining member may be formed into a flat plate shape existing substantially in the vertical direction, or may be provided with a part of a substantially L-shaped section as set forth below.

More specifically, the restraining member has the part of the substantially L-shaped section including a vertical wall portion and a horizontal wall portion extending from a lower end of the vertical wall portion toward the vehicle's inner side. The vertical wall portion supports the vehicle's outer side of the folded air bag. The upper surface side of the horizontal wall portion is a guide surface. The lower end side of the lid pushing part of the air bag is. supported on the guide surface.

In the head protecting air bag apparatus, the part of the air bag existing at the position of the restraining member (the lid pushing part) is folded along the horizontal wall portion while the bellows fold state substantially in the vertical direction is twisted. Thus, when the expanding gas flows into the lid pushing part, the air bag's volume is immediately expanded toward the vehicle's inner side along the guide surface of the upper side of the horizontal wall portion. The lid pushing part pushes and opens the lid and projects toward the vehicle's inner side without being caught by the horizontal wall portion of the restraining member. Of course, the part of the air bag other than the lid pushing part, folds substantially in the vertical direction and is folded in the bellows fold. Thus, when the air bag unfolds and expands, the other part of the air bag projects toward the lower side. Because of the force of the other part of the air bag toward the lower side, the lid pushing part also projects downward after projecting toward the vehicle's inner side. As a result, the whole of the air bag smoothly covers the opening at the vehicle's inner side.

When the lid pushing part of the airbag is formed without paying consideration to twisting, it may be structured by using a restraining member as follows. The restraining member exists at an upper position of the pillar portion, and when the air bag unfolds and expands prevents it from intruding into the vehicle's outer side of the pillar garnish. The restraining member is provided with a part of a substantially L-shaped section including a vertical wall portion and a horizontal wall portion extending from a lower end of the vertical wall portion toward the vehicle's inner side.

In a first case of the head protecting air bag apparatus where the lid pushing part is formed without paying consideration to twisting, the air bag in a non-expansion and flat unfolded state is folded in the bellows fold (in which it is folded substantially in the vertical direction from the lower edge side to the upper edge side). The vertical wall portion of the restraining member supports the vehicle's outer side of the folded air bag. The horizontal wall portion of the restraining member supports the lower end side of the folded air bag, and is disposed so that an intersection angle to the lid is made an acute angle. The lid pushing part of the air bag is constructed by forming a part expanding at a narrow intersection part between the lid and the horizontal wall portion.

The above head protecting air bag apparatus operates as follows. The volume of the lid pushing part of the air bag, expands by the inflow of gas. The vehicle's outer side end surface and the lower end surface of the expansion part are restrained by the vertical wall portion and the horizontal wall portion. Also in the upper side of the expansion part, upward large movement is restrained because the airbag is attached to the vehicle body by the attachment portion at the upper edge side of the air bag. As a result, the expansion part is moved along the horizontal wall portion to the lid side. The intersection angle between the horizontal wall portion and the lid is made acute. Thus, the expansion part intrudes into the narrow acute part between the horizontal wall portion and the lid when expanding, and further increases the pressure. As a result, the expansion part quickly pushes and opens the lid, and projects to the vehicle's inner side. The lid itself is disposed substantially in the vertical direction. Since the intersection angle to the lid is acute, the horizontal wall portion exists not in a horizontal state but in a state slanted toward the vertical direction side. As a result, even if a part of the air bag is caught by the horizontal wall portion and is liable to remain, the air bag smoothly projects to the vehicle's inner side in such a manner that it slides down the horizontal wall portion.

It is desirable that the intersection angle between the horizontal wall portion and the lid is in the range of 50° to 80°. If the intersection angle exceeds 80°, a part of the air bag might be caught by the horizontal wall portion. If the intersection angle is less than 50°, a gap between the horizontal wall portion and the lid is too narrow, and the lid must be enlarged which is undesirable.

In a second case of the head protecting air bag apparatus where the lid pushing part of the air bag is formed without paying consideration to twisting, the air bag in the non-expansion and flat unfolded state is folded (in the bellows fold in which it is folded substantially in the vertical direction from the lower edge side to the upper edge side). The vertical wall portion of the restraining member supports the vehicle's outer side of the folded air bag, and the horizontal wall portion of the restraining member supports the lower end side of the folded air bag. The lid pushing part is formed by disposing the lower edge tip end side of the air bag so as to cover the upper portion from the lower portion of the folded air bag through the vehicle's inner side.

In the head protecting air bag apparatus described above, when the volume of the part of the air bag disposed at the position of the restraining member (the lid pushing part) is expanded by the inflow of the gas, the winding of the lower edge of the air bag (covering the upper portion from the lower portion of the folded air bag through the vehicle's inner side) is loosened. Then the lower edge of the air bag is unfolded toward the vehicle's inner side to push and open the lid, and projects to the vehicle's inner side. Thereafter, the lid pushing part projects from the opening of the opened lid to the vehicle's inner side. Then the lid pushing part smoothly projects to the vehicle's inner side in such a manner that it is guided by the lower edge of the air bag projecting to the vehicle's inner side, and the lower edge of the air bag is not caught by the horizontal wall portion.

In a third case of the head protecting air bag apparatus where the lid pushing part of the air bag is formed without paying consideration to twisting, a vertical wall portion of a restraining member supports the vehicle's outer side of the folded air bag, and a horizontal wall portion supports the lower end side of the folded air bag. The lid pushing part is formed by folding the air bag so that a part near the vertical wall portion side is expanded at the beginning of the inflow of expanding gas.

For the head protecting air bag apparatus described above, when the expanding gas flows into the part of the air bag disposed at the position of the restraining member (the lid pushing part), the part of the air bag near the vertical wall portion side expands. Then, the part of the air bag at the lid side is pushed by the expansion, moves along the horizontal wall portion to push and open the lid, and projects to the vehicle's inner side. Further, the part of the air bag near the vertical wall portion side, which is expanded from the beginning, also smoothly expands and projects to the vehicle's inner side without being caught by the horizontal wall portion.

An example of the third head protecting air bag apparatus has an upstream side part and a downstream side part of the gas provided in the air bag. At the part of the air bag existing at the position of the restraining member (the lid pushing part), the upstream side part of the expanding gas exists at the vertical wall portion side of the restraining member, and the downstream side part of the expanding gas exists at the lid side.

In this case, the air bag may be folded substantially in the vertical direction. However, it may be folded as follows. A fold is provided substantially at an intermediate position in the vertical direction, and the air bag is folded in half from a flat unfolded state of a non-expansion state so that the lower edge side of the air bag is folded back to the vehicle's inner side. Further, the air bag is folded in the bellows fold (in which it is folded substantially in the vertical direction from the lower edge side of the air bag folded in half to the upper edge side). In the lid pushing part of the air bag, the upstream side part exists at the upper edge side of the air bag in the non-expansion and flat unfolded state, and the downstream side part exists at the lower edge side of the air bag in the non-expansion and flat unfolded state.

For the head protecting air bag apparatus described above, when the expanding gas flows into the part of the air bag disposed at the position of the restraining member (the lid pushing part), the upstream side part of the gas at the vertical wall portion side expands. Then, the lower edge side part of the air bag is pushed by the upstream side part, pushes and opens the lid, and projects to the vehicle's inner side. Then the upstream side and downstream side parts of the gas smoothly expand and project to the vehicle's inner side without being caught by the horizontal wall portion.

In the case where the upstream side part of the gas exists at the vertical wall portion side of the restraining member, the downstream side part of the expanding gas is disposed at the lid side, and the lid pushing part of the air bag is formed, the following structure may be adopted. That is, in the lid pushing part, a projection portion projecting from the upstream side part is provided at the upper edge or the lower edge of the air bag. The projection portion is disposed at an end surface of the folded air bag at the vehicle's outer side so that the projection portion faces the vertical wall portion of the restraining member.

In the above head protecting air bag apparatus, when the gas for expansion flows into the part of the air bag disposed at the position of the restraining member (the lid pushing part of the air bag), the upstream side part of the gas, together with the projection portion, expands. The projection portion is restrained by the vertical wall portion. Thus, a part other than the projection portion is pushed by the projection portion and is moved along the horizontal wall portion, so that it pushes and opens the lid and projects to the vehicle's inner side. As a result, both the upstream side and downstream side parts of the gas for expansion are smoothly expanded and project to the vehicle's inner side without being caught by the horizontal wall portion.

The following structure may be adopted as another example of the third head protecting air bag apparatus. An expansion portion into which the expanding gas can flow, and a non-expansion portion into which the expanding gas can not flow are provided in the lid pushing part of the air bag. At the edge of the expansion portion in the vertical direction, the periphery is cut out to form a cut piece portion which can be bent to the vehicle's outer side. The cut piece portion is disposed at the end surface of the folded air bag at the vehicle's outer side so that it faces the vertical wall portion of the restraining member.

In the head protecting air bag apparatus described above, when the expanding gas flows into the air bag, in the part of the air bag disposed at the position of the restraining member (the lid pushing part), the expansion portion, together with the cut piece portion, expands. The cut piece portion is restrained by the vertical wall portion. Thus, the cut piece portion pushes a part other than the cut piece portion and moves it along the horizontal wall portion so that it pushes and opens the lid and projects to the vehicle's inner side. As a result, the cut piece portion near the vertical wall portion side, which expands from the beginning, smoothly expands and projects to the vehicle's inner side without being caught by the horizontal wall portion.

A fourth head protecting air bag apparatus exists where the lid pushing part of the airbag is formed without paying consideration to twisting, the vertical wall portion supports the vehicle's outer side of the folded air bag, and the horizontal wall portion supports the lower end of the folded air bag. The air bag in the non-extension and flat unfolded state and is folded in the bellows fold (in which it is folded substantially in the vertical direction from the lower edge side to the upper edge side). In the lid pushing part, an upper edge side flow path which exists at the upper edge of the air bag and in which the expanding gas can flow, and a lower edge flow path which exists at the lower edge of the air bag and in which the expanding gas can flow, are provided. The flow rate of the expanding gas in the lower edge side flow path is set larger than the flow rate of the gas for expansion in the upper edge side flow path.

In the fourth head protecting air bag apparatus described above, when the expanding gas flows into the air bag, in the part of the air bag disposed at the position of the restraining member (the lid pushing part), the volume of the lower edge side flow path at the horizontal wall portion side expands. Then the side of the upper edge side flow path is pushed up in the direction orthogonal to the horizontal wall portion. However, since the attachment portion of the upper edge side of the air bag is attached to the vehicle body, and the volume of the upstream side flow path is slightly expanded, large movement to the upside is restrained. Accordingly, the part of the air bag disposed at the position of the restraining member (the lid pushing part) is guided to the lid side where the vertical wall portion is not disposed, pushes and opens the lid, and projects to the vehicle's inner side. As a result, in the part having the intensified force to push and open the lid, both the upper edge side and lower edge side parts are smoothly expanded and project to the vehicle's inner side without being caught by the horizontal wall portion.

In a fifth case of the head protecting air bag apparatus where the lid pushing part of the air bag is formed without paying consideration to twisting, the vertical wall portion supports the vehicle's outer side of the folded air bag, and the horizontal wall portion supports the lower end side of the folded air bag. The lid pushing part is provided with a flexible wrapping sheet covering the folded air bag. An upper end of the wrapping sheet is fixed to the upper edge of the air bag. A lower end of the wrapping sheet is wound around the vehicle's inner side of the folded air bag and the lower end and is brought into contact with the horizontal wall portion of the restraining member. Further, the lower end of the wrapping sheet is inserted between the folds of the folded air bag at the vehicle's outer side and is held between the folds to be disposed. The frictional resistance of a front surface of the wrapping sheet brought into contact with the horizontal wall portion is made lower than the frictional resistance of a back surface brought into contact with the air bag.

In the fifth head protecting air bag described above, when the volume of the part of the air bag disposed at the position of the restraining member (the lid pushing part) expands by the inflow of the expanding gas, it is pushed up in the direction orthogonal to the horizontal wall portion. However, the attachment portion of the upper edge side of the air bag is attached to the vehicle body, and large movement to the upside is restrained. Thus, the lid pushing part is guided to the lid side where the vertical wall portion is not disposed. The frictional resistance of the front surface of the wrapping sheet brought into contact with the horizontal wall portion is made lower than that of the back surface brought into contact with the air bag. Thus, while the state where the lower end of the wrapping sheet is held between the folds of the folded air bag at the vehicle's outer side is maintained, the lid pushing part slides on the horizontal wall portion and is guided to the lid side where the vertical wall portion is not disposed. Then the lid pushing part pushes and opens the lid, and projects to the vehicle's inner side. Further, the lower end of the wrapping sheet drops out of the folds of the air bag, and the winding of the wrapping sheet is loosened. As a result, the lid pushing part smoothly expands and projects to the vehicle's inner side without being caught by the horizontal wall portion.

BRIEF DESCRIPTION OF THE DRAWINGS

FIG. 6 is a front view showing an air bag assembly of the first embodiment.

FIGS. 10A and 10B are views showing unfolding and expansion of an air bag shown in FIG. 9.

DESCRIPTION OF THE PREFERRED EMBODIMENTS

Figure 1:
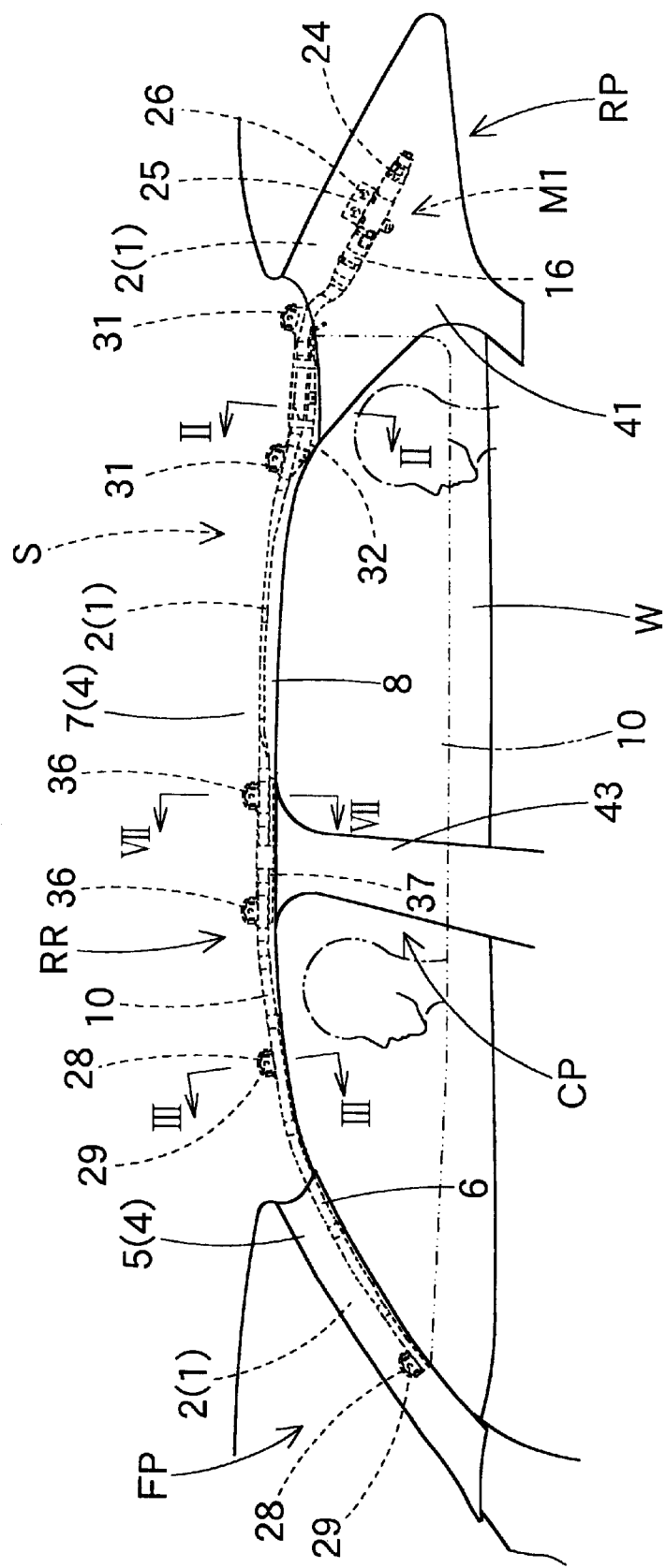
FIG. 1 is a front view of a head protecting air bag apparatus of the present invention, seen from the inside of a vehicle.

Hereinafter, the present invention will be described on the basis of embodiments shown in the drawings. However, the present invention is not limited to these embodiments but covers all modifications within the scope of the claims.

Figure 2:
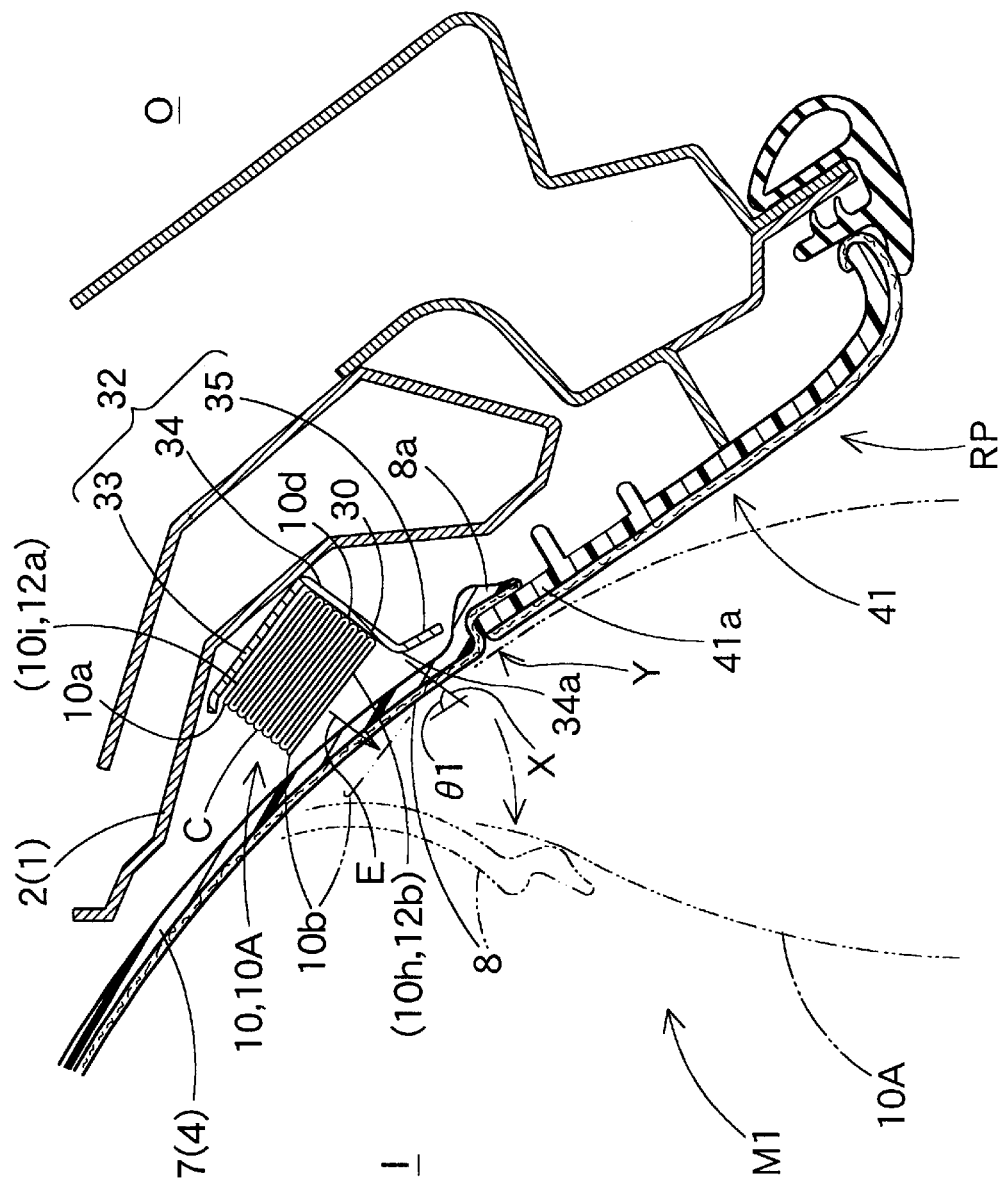
FIG. 2 is a schematic enlargement sectional view at location II—II of FIG. 1.
Figure 3:
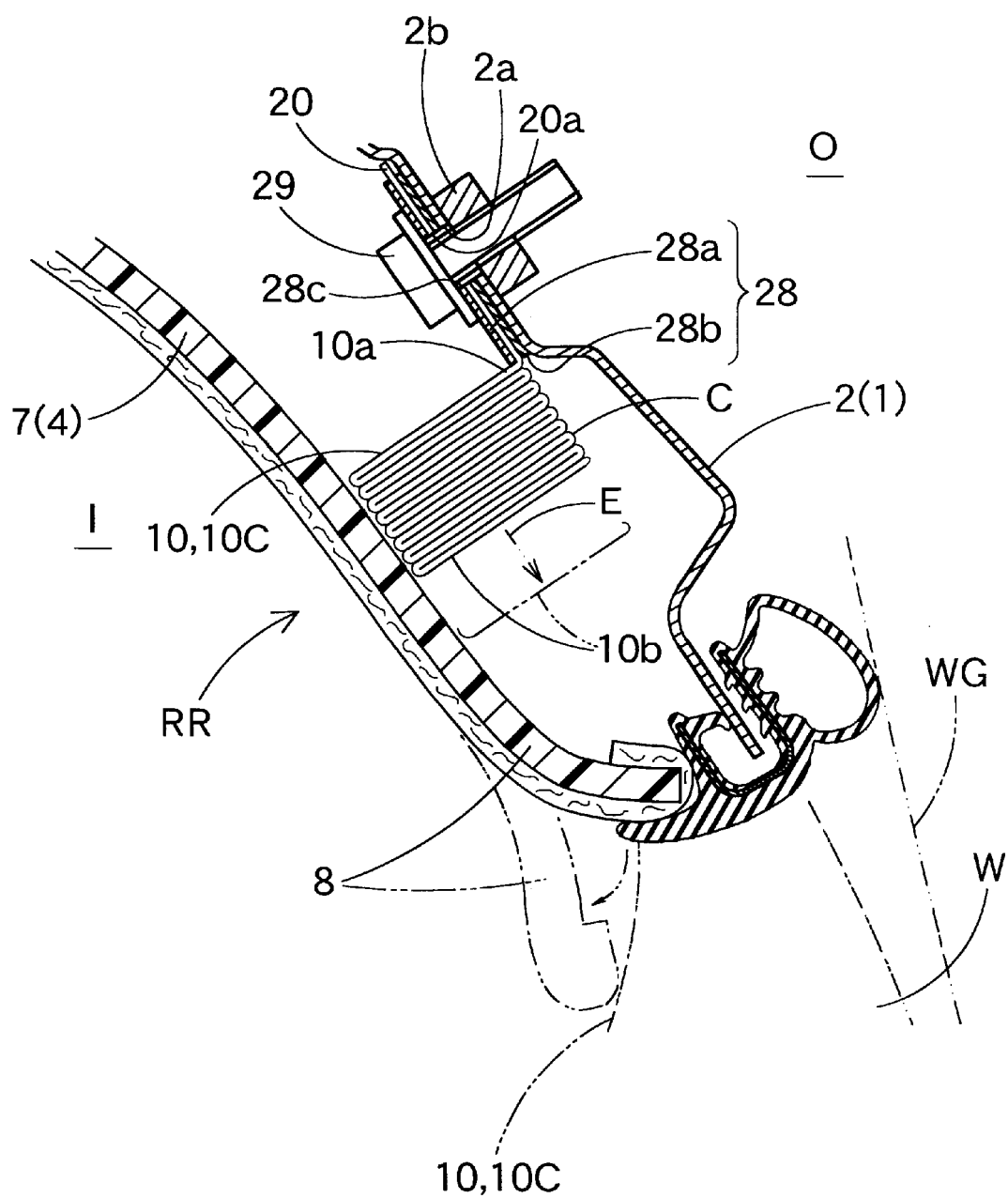
FIG. 3 is a schematic enlargement sectional view it location III—III of FIG. 1.

The first embodiment of the head protecting air bag apparatus M1 shown in FIGS. 1 to 3 is constructed to include an air bag, 10, as shown in FIG. 1. The air bag 10 is in a folded state and exists at a vehicle's inner side door and of the periphery of the upper edge side of an opening W of a window portion. Specifically, the folded air bag 10 exists over the vehicle's inner side front pillar portion FP, the roof side rail portion RR, and the rear pillar portion RP.

The head protecting air bag apparatus M1 is constructed to include the air bag 10, an inflator 24, attachment brackets 25, 28, 31 and 36, restraining members 32 and 37, and an air bag cover 4.

The inflator 24 supplies expanding gas to the folded air bag 10 as shown in FIGS. 1 and 6 and is cylindrical in shape. The inflator 24 is covered with a later-described gas inflow portion 16 of the air bag 10.

The attachment bracket 25 is made of a metal plate. As shown in FIGS. 1 and 6, the bracket 25 attaches the inflator 24 and the gas inflow portion 16 of the air bag 10 to the vehicle body 1 at the rear pillar portion RP inside of the vehicle. The attachment bracket 25 pinches the gas inflow portion 16 provided on the inflator 24 from the outer peripheral side. The attachment bracket 25 attaches by using two bolts 26 to the inner panel 2 made of a metal plate at the side of the vehicle body 1.

The air bag cover 4 is made by a pillar garnish 5 existing at the front pillar portion FP and a roof interior member 7 disposed at the rood side rail portion RR.

Figure 7:
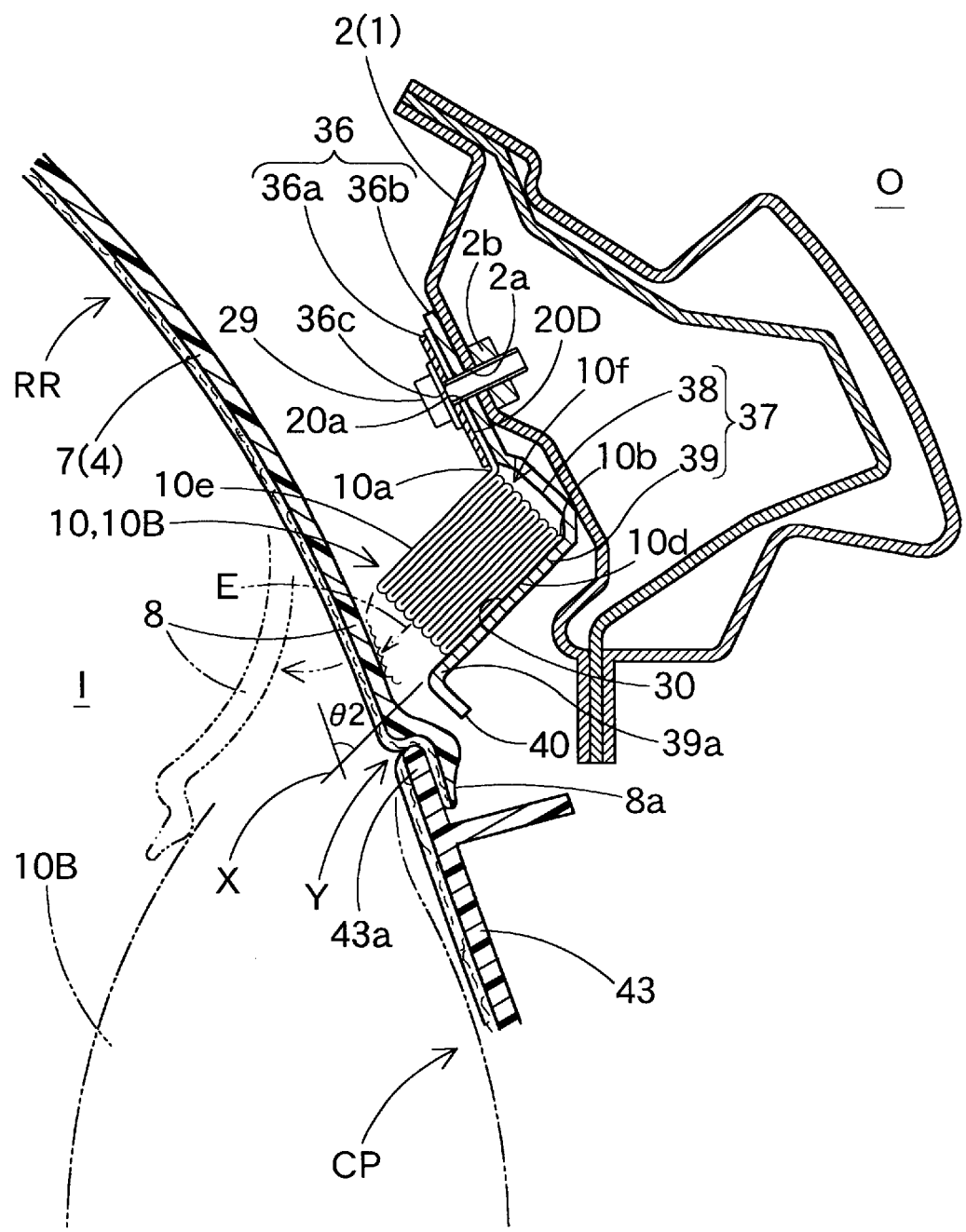
FIG. 7 is a schematic enlargement sectional view of location VII—VII of FIG. 1.

The roof interior member 7 is made of synthetic resin. As shown in FIGS. 1 through 3 and 7, the roof interior member 7 is attached to the inner panel 2 of the body 1 at the vehicle's inner side I of the roof side rail portion RR by attachment means which are not shown. The roof interior member 7 has a lid 8 at its lower edge side. The lower end side 8a of the lid 8 opens to inside the vehicle I so that the air bag can project when it unfolds and expands. As shown in FIGS. 2 and 7, the lower end 8a of the lid 8 intrudes into the vehicle's outer side O of an upper end 41a or 43a of a rear pillar garnish 41 or a center pillar garnish 43 described later. The lid lower end 8a is fixed by the upper end 41a or 43a.

The front pillar garnish 5 is also made of synthetic resin. The garnish 5 is attached to the inner panel 2 of the body 1 at the front pillar portion FP inside the vehicle. The garnish 5 is provided with a lid 6 at its lower edge side. The lid 6 opens towards the inside of the vehicle I so that the air bag 10 can project when it unfolds and expands.

Figure 4:
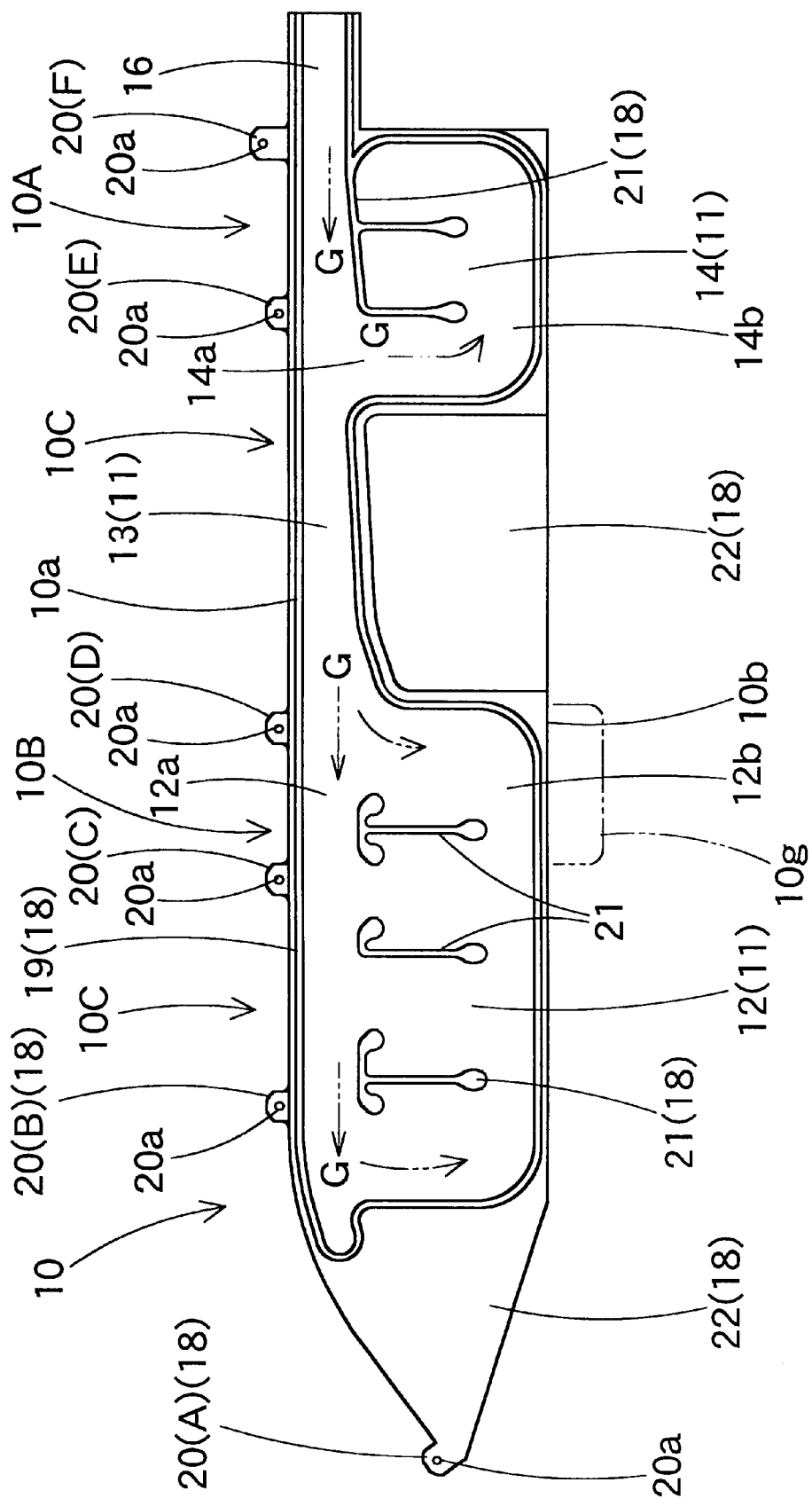
FIG. 4 is a front view showing an unfolded state of an air bag, used for the first embodiment, at the time of non-expansion.

The air bag 10 is a flexible bag as shown in FIGS. 1 and 4, and is formed by a hollow weave using a polyamide yarn or the like. The air bag 10 is constituted by an expansion portion 11 and a non-expansion portion 18. The expansion portion 11 expands by inflowing gas from the inflator 24. The non-expansion portion 18 does not receive the expanding gas.

The expansion portion 11 is constituted by a front expansion portion 12, a rear expansion portion 14, and a communicating portion 13. The front expansion portion 12 exists at the side of a front seat at the vehicle's outer side when the air bag 10 unfolds and expands. The rear expansion portion 14 is disposed at the side of a rear seat at the vehicle's outer side when the air bag 10 expands. The communicating portion 13 is for communicating the upper portions of the front expansion portion 12 and the rear expansion portion 14 with each other. The cylindrical gas inflow portion 16 for insertion of the inflator 24 is connected to the rear upper end of the rear expansion portion 14.

The non-expansion portion 18 has a peripheral portion 19, restraining members 21, and plate-like portions 22. The peripheral portion 19 is disposed at the outer periphery of the expansion portion 11, and is closely woven so as to secure airtightness. The restraining members 21 are disposed so as to divide the expansion portion 11 at the time of expansion. The restraining members 21 are disposed to substantially uniformly restrain the thicknesses of the respective portions of the expansion portion 11. The number of restraining members 21 (3 in this embodiment) are formed in the region of the front expansion portion 12 separately from the peripheral portion 19. In the region of the rear expansion portion 14, the restraining member 21 extends to the front from the rear side of the peripheral portion 19 and is formed to extend downward like branches. The plate-like portions 22 are disposed to decrease the volume of the expansion portion 11. In the case of this embodiment, the plate-like portions 22 are disposed at two positions, that is, a position between the front and rear expansion portions 12 and 14 below the communicating portion 13 and a position at the front side of the front expansion portion 12.

The flow of the expanding gas G in the air bag 10 will be described. First, as shown in FIG. 4, the gas G flows into the expansion portion 11 from the gas inflow portion 16 provided on the inflator 24. Then, the gas G flows through the upper portion of the rear expansion portion 14 at the rear side, through the communicating portion 13, to the side of the upper edge 12a of the front expansion portion 12 at the front side. The gas G flows to the side of the lower edge 12b of the front expansion portion 12, and the entire front expansion portion 12 expands. At the same time, the gas G flows from the side of the upper edge 14a of the rear expansion portion 14 to the side of the lower edge 14b, and the entire rear expansion portion 14 expands. Then the air bag 10 is completely expanded.

The number of attachment portions 20 (6 in this embodiment) are formed at the side of the upper edge 10a of the air bag 10. The attachment portions 20 extend from the peripheral portion 19 and the plate-like portions 22 to the upside. Each of the attachment portions 20 is provided with an attachment hole 20a at its center. An attachment bolt 29 (see FIGS. 3 and 7) is inserted through the attachment hole 20a. The respective attachment holes 20a are formed by boring after the hollow weave of the air bag 10.

As shown in FIGS. 1, 3, 6 and 7, the attachment brackets 28, 31 and 36 are made of metal plates and are fixed to the respective attachment portions 20. The brackets 28, 31 and 36 are used for firmly attaching the folded air bag 10 to the inner panel 2 at the side of the body 1.

The attachment brackets 28 are made of metal plates. As shown in FIGS. 1, 3, 4 and 6, the two brackets 28 pinch the two attachment portions 20A and 20B at the front side, respectively. Each of the brackets 28 has an inner plate 28a at the inside of the vehicle I and an outer plate 28b at the vehicle's outer side O. The inner and outer plates 28a and 28b have an attachment hole 28c. The attachment hole 28c is bored to correspond to the attachment hole 20a of each of the attachment portions 20A and 20B. The respective attachment portions 20A and 20B are, as shown in FIG. 3, attached to the inner panel 2 by using the attachment bolts 29 and the brackets 28. The respective bolts 29 are inserted in the attachment holes 28c and 20a and are engaged with nuts 2b. The nuts 2b are fixed to the peripheral edges of the attachment holes 2a of the inner panel 2.

As shown in FIGS. 1, 4 and 6, the attachment brackets 31 pinch the two rear side attachment portions 20E and 20F, respectively. Similar to the brackets represented as 28, each of the brackets represented by 31 is provided with an inner plate 31a at the vehicle's inner side I and an outer plate 31b at the vehicle's outer side O. The inner and outer plates 31a and 31b have an attachment hole 41c corresponding to the attachment hole 20a of each of the attachment portions 20E and 20F. The attachment brackets 31 are disposed at the upper position of the garnish 41 at the vehicle's inner side I in the rear pillar portion RP.

As shown in FIGS. 1, 4, 6 and 7, the attachment brackets 36 pinch the two intermediate attachment portions 20C and 20D in the. longitudinal direction, respectively. Similarly to the brackets 28, each of the two brackets 36 is provided with an inner plate 36a at the vehicle's inner side I and an outer plate 36b at the vehicle's outer side O. The inner and outer plates 36a and 36b have an attachment hole 36c corresponding to the attachment hole 20a of each of the attachment portions 20C and 20D. The attachment brackets 36 are disposed at the upper positions of the garnish 43 at the vehicle's inner side I in the center pillar portion CP.

Further, the two brackets 31 are mutually connected at the lower edge side of the outer plates 31b and 31b by the restraining member 32. The two attachment brackets 36 are also mutually connected at the lower edge side of the outer plates 31b and 31b by the restraining member 37.

The restraining members 32 and 37 exist to prevent the air bag 10 from intruding into the vehicle's outer side O of the garnishes 41 and 43 when the air bag 10 begins to unfold and expand. That is, even if the air bag 10 starts to unfold and expand downward, the air bag 10 does not intrude into a space between the rear pillar garnish 41 and the inner panel 2 or a space between the center pillar garnish 43 and the inner panel 2 by the restraining members 32 and 37.

When the air bag 10 is folded and housed in the. body 1 at the vehicle's outer side O of the lid 8, parts 10A and 10B of the air bag existing at the positions of the restraining members 32 and 37 increase in force to push and open the lid 8.

The respective restraining members 32 and 37 are constructed by parts of substantially L-shaped sections including vertical wall portions 33 and 38 and horizontal wall portions 34 and 39, respectively. The vertical wall portions 33 and 38 support the vehicle's outer side O of the folded air bag 10. The horizontal wall portions 34 and 39 extend toward the vehicle's inner side I, from the lower end of the vertical wall portions 33 and 38. The horizontal wall portions 34 and 39 support the side of the lower end surface 10d of the folded air bag 10. Extension portions 35 and 40 extending downward are formed at ends 34a and 39a of the horizontal wall portions 34 and 39 of the respective restraining members 32 and 37.

In the restraining members 32 and 37, as shown in FIGS. 2 and 7, the horizontal wall portions 34 and 39 intersect with the vertical wall portions 33 and 38 at about 90°. The restraining members 32 and 37 are disposed in the inner panel 2 so that extension lines X of the horizontal wall portions 34 and 39 intersect with the lid 8. The upper surface sides of the horizontal wall portions 34 and 39 make guide surfaces 30 for guiding the unfolding and expanding air bag 10.

An intersection angle $\theta1$ between the extension line X of the horizontal wall portion 34 and the lid 8 is set to substantially 90° so that the unfolding direction E of the part 10A of the folded air bag is directed to the side of the lid 8. In the case of the embodiment, the angle $\theta1$ is made an acute angle of about 65°. The extension X of the horizontal wall portion 39 intersects with the lid 8 at an angle $\theta2$ (in this embodiment, about 65°) of an acute angle of 50° to 80°.

In the restraining member 32, at the inner panel 2, are the locations where the respective attachment brackets 31 attach to the inner panel 2 and is set to a predetermined angle. Thus, the extension line X of the horizontal wall portion 34 intersects with the lid 8 at an angle $\theta1$ of an acute angle. In the restraining member 37, the outer plates 36b of the respective attachment brackets 36 are provided to be slanted from the vertical wall portions 38. Thus, the extension line X of the horizontal wall portion 39 exists at an angle $\theta2$ of an acute angle with respect to the lid 8.

Further, in the respective horizontal wall portions 34 and 39, the vehicle's inner side of the guide surface 30 is lowered, so that it is slanted. The direction of the extension line X of the guide surface 30 to the side of the lid 8 is directed upward from the Y position. The Y position is a parting portion at the vehicle's inner side between the lid's lower end 8a and the pillar garnish's upper end 41a or 43a. That is, the direction of the extension line X is directed to the side of the lid 8 (upward side) going away from the pillar garnish 41 or 43.

Figure 5:
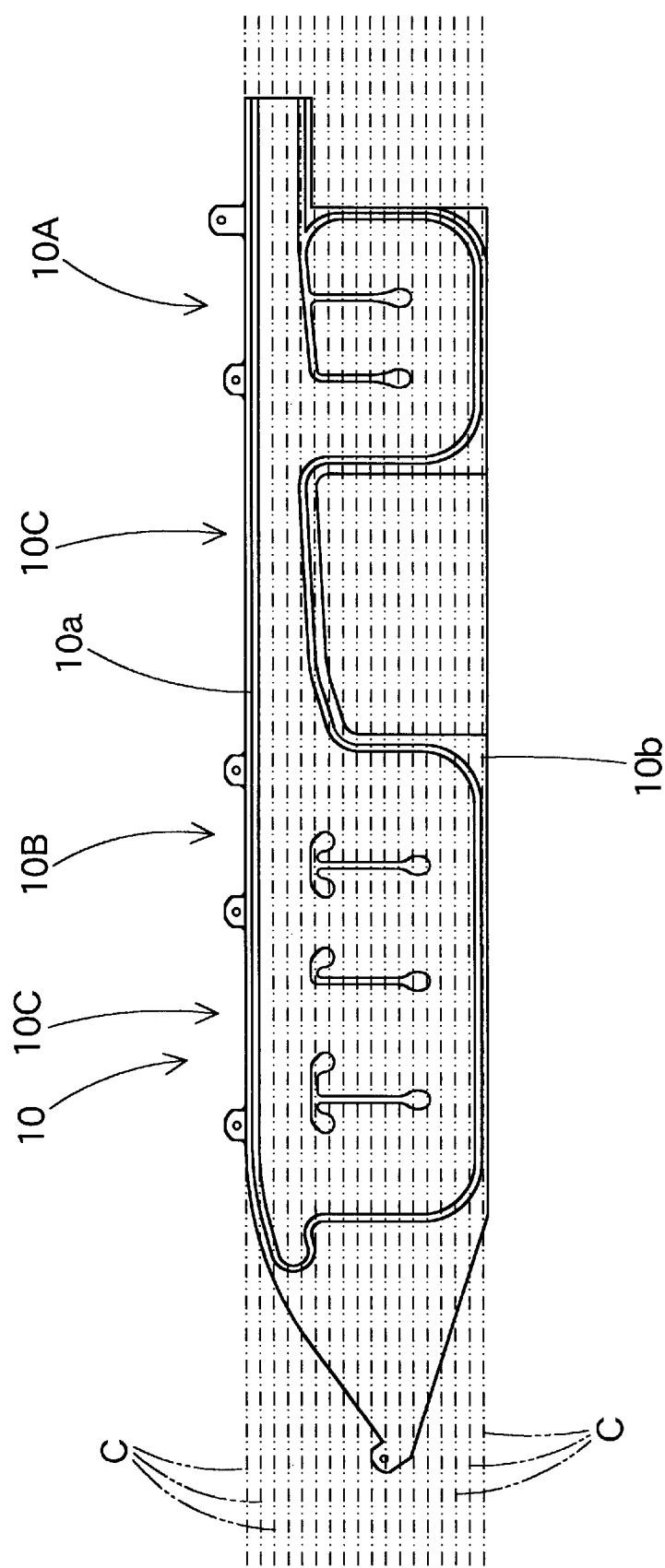
FIG. 5 is a view showing folds when the air bag of the first embodiment is folded.

The first embodiment of the assemblage of the head protecting air bag apparatus M1 will now be described. First, the air bag 10 is folded as shown in FIG. 5, in a bellows fold in which it is folded substantially in the vertical direction from a flat unfolded, non-expanded state. More specifically, the air bag 10 is folded such that folds C parallel to the upper edge 10a are formed and the side of the lower edge 10b approaches the side of the upper edge 10a. Further, after it is folded, tape members T1 are wound around the air bag 10 at predetermined intervals shown in FIG. 6. The tape members T1 are rupturable and are used for keeping the airbag in the folded state. The sectional shape of the air bag 10 after folding is substantially rectangular except for the attachment portion 20.

After folding, the attachment brackets 28 are respectively attached to the attachment portions 20A and 20B at the front side. The attachment brackets 36 (with the restraining members 37) are attached to the intermediate attachment portions 20C and 20D, respectively. Rupturable tape member T3 is wound around the periphery of the restraining member 37 together with the air bag 10. At this time, an end surface 10f of the folded air bag 10 at the vehicle's outer side O is supported at the vehicle's inner side I of the vertical wall portion 38 of the restraining member 37. The lower end surface 10d of the folded air bag 10 is supported by the guide surface 30 of the upper surface side of the horizontal wall portion 39.

Further, the vicinity of a placement part of the air bag 10 to the attachment bracket 31 is twisted. Then, the attachment brickets 31 provided with the restraining member 32 are attached to the rear side attachment portions 20E and 20F. Further, rupturable tape members T2 are wound around the periphery of the restraining member 32 together with the air bag 10. Incidentally, in the twisted state of the air bag 10, the side of the upper edge 10a is disposed so as to be supported at the side of the vertical wall portion 33 of the restraining member 32. The side of the lower edge 10b is disposed at the side where it goes away from the vertical wall portion 33. Further, the folds C of the bellows fold are piled up along the horizontal wall portion 34 from the side of the vertical wall portion 33. More specifically, the rear side part 10A of the folded air bag 10 is twisted in a clockwise direction by about 90° toward the front side. In this embodiment, setting is made such that a spiral part of twisting starts and ends in the restraining member 32. Setting is made such that the twisting spiral does not occur at the rear side gas inflow portion 16 (see a spiral edge L of FIG. 6).

After the tape members T2 are wound, the fold of the gas inflow portion 16 is loosened, and the inflator 24 is inserted in the gas inflow portion 16. The attachment bracket 25 is attached to the outer peripheral side of the gas inflow portion 16 thus forming the air bag assembly S.

Thereafter, the respective attachment brackets 25, 28, 31 and 36 exist at predetermined positions of the inner panel 2.

The respective brackets 25, 28, 31 and 36 are fixed to the inner panel 2 by using the bolts 26:and 29 inserted through the respective attachment holes 20a, 28c, 31c and 36c. This allows the air bag assembly S to be attached to the body 1. Next, the front pillar garnish 5 and the roof interior member 7 are attached to the body 1 and then, the rear pillar garnish 41 and the center pillar garnish 43 are attached to the body 1. As a result, the head protecting air bag apparatus M1 is mounted in the vehicle.

After mounting of the apparatus M1 in the vehicle, the expanding gas from the inflator 24 flows from the gas inflow portion 16 to the rear expansion portion 14, when the inflator 24 is operated. Then the gas flows to the communicating portion 13 and the front expansion portion 12 of the expansion portion 11. Subsequently, the expansion portion 11 of the air bag 10 starts to expand while the folds are loosened. The air bag 10 then ruptures the tape members T1, T2 and T3. In turn, the air bag 10 pushes and opens the lids 6 and 8 of the front pillar garnish 5 and the roof interior member 7, and largely expands to cover the opening W as shown by two-dot chain lines of FIGS. 1 to 3 and 7.

In the rear pillar portion RP of the first embodiment, the part 10A of the air bag 10 disposed at the position of the restraining member 32 is, as shown in FIG. 2, twisted from the other general part 10C (see FIGS. 3, 4 and 6), and is folded along the horizontal wall portion 34. Incidentally, in the general part 10C, the air bag is folded substantially in the vertical direction. When it unfolds and expands 10, from the expanding gas flowing into the part 10A, its volume expands to the vehicle's inner side I along the guide surface 30 of the horizontal wall portion 34. More specifically, as shown by the two-dot chain line of FIG. 2, part 10A immediately expands to the vehicle's inner side I, and pushes and opens the lid 8. At this time, even if the lower end 8a of the lid is fastened to the upper end 41a of the rear pillar garnish, the lower end 8a easily gets over the upper end 41a and the lid 8 opens. The part 10A expands to the vehicle's inner side I and projects to the vehicle's inner side I without being caught by the horizontal wall portion 34.

The general part 10C of the air bag 10 other than the part 10A disposed at the position of the restraining member 32 is, as shown in FIG. 3, is folded substantially in the vertical direction and is in the bellows fold. Further, the general part 10C is disposed along the side window glass WG. Thus, the general part 10C projects to the downward side along the side window glass WG. By the downward force of the part 10C, the part 10A of the air bag 10 also projects downward after projecting to the vehicle's inner side I. As a result, the air bag 10 smoothly covers the opening W at the vehicle's inner side I.

When the air bag expands, in the center pillar portion CP of the first embodiment, the expanding gas also glows into the part 10B of the air bag 10 existing at the position of the restraining member 37 and its volume expands as shown in FIG. 7. In the part 10B, the terminal surface 10f at the vehicle's outer side and the lower surface 10d are restrained by the vertical wall portion 38 and the horizontal wall portion 39. The side of the air bag upper edge 10a is attached to the inner panel 2 of the body 1 by using the attachment portions 20C and 20D. Thus, large upward movement is restrained also at the side of the upper portion 10e of the part 10B. As a result, the part 10B is moved to the side of the lid 8 along the guide surface 30 of the horizontal wall portion 39. The intersection angle θ2 between the extension line X of the guide surface 30 of the horizontal wall portion 39 and the lid 8 is made an acute angle. Thus, the air bag part 10B intrudes into the acute narrow part between the horizontal wall portion 39 and the lid 8 while expanding, and further increases the pressure. As a result, the part 10B quickly pushes and opens the lid 8 and projects to the vehicle's inner side I. At this time, even if the lower end 8a of the lid is fastened to the upper end 43a of the center pillar garnish 43, the lower end 8a easily gets over the upper 43a and the lid 8 opens. The lid itself 8 is disposed substantially in the vertical direction. The intersection angle θ2 between the horizontal wall portion 39 and the lid 8 makes an acute angle. Thus, the horizontal wall portion 39 is disposed not in the horizontal state but in the state where it slants to the side of the vertical direction. As a result, even if a part of the air bag part 10B is caught by the horizontal wall portion 39 and might remain, it still slides down the horizontal wall portion 39. Consequently, the air bag part 10B smoothly projects to the vehicle's inner side I.

Thus, in the first embodiment of the head protecting air bag apparatus M1 parts 10A and 10B begin to unfold and expand smoothly pushing and opening the lid 8. Even if the restraining members 32 and 37 are disposed, parts 10A and 10B are not caught by the restraining members 23 and 37, and projects to the vehicle's inner side I. Thus, the air bag 10 smoothly unfolds and expands, and covers the opening W.

Incidentally, in the first embodiment, the twisted spiral part of the air bag 10 is disposed in the range of the rear side restraining member 32. Then the rupturable tape members T2 are wound around the restraining member 32 together with the part 10A of the air bag 10, and the twisted state of the part 10A of the air bag is kept. Thus, on the horizontal wall portion 34, the position of the part which is folded at the folds C along the horizontal wall portion 34 and its length in the longitudinal direction can be suitably adjusted on the horizontal wall portion 34 and can be kept.

In the first embodiment, with respect to the rear side restraining member 32, the intersection angle θ1 between the extension line X of the guide surface 30 of the horizontal wall portion 34 and the lid 8 makes an acute angle. More specifically, the horizontal wall portion 34 has such an angle that the air bag part 10A easily slides down to the vehicle's inner side I. Thus, the air bag part 10A is further prevented from being caught by the horizontal wall portion 34 and is separated to the vehicle's inner side I.

Incidentally, when the intersection angles θ1 and θ2 between the extension lines X of the guide surfaces 30 of the horizontal wall portions 34 and 39 and the lid 8 make acute angles, the horizontal wall portions 34 and 39 may intersect with the vertical wall portions 33 and 38 at obtuse angles. However, the sections of the folded air bag parts 10A and 10B are substantially rectangular. Thus, in the case where the intersection angles between the vertical wall portions 33 and 38 and the horizontal wall portions 34 and 39 make obtuse angles, it is difficult to support the air bag parts 10A and 10B stably between the vertical wall portions 33 and 38 and the horizontal wall portions 34 and 39.

If the intersection angle θ2 between the extension line X of the guide surface 30 of the horizontal wall portion 39 of the restraining member and the lid 8 exceeds 80°, a portion of the air bag part 10B might be caught by the horizontal wall portion 39. If the intersection angle θ2 is less than 50°, the gap between the horizontal wall portion 39 and the lid 8 is too narrow, and it becomes necessary to increase the lid 8, which is not desired. Thus, the desired intersection angle θ2 is in the range of 50° to 80°.

Figure 8:
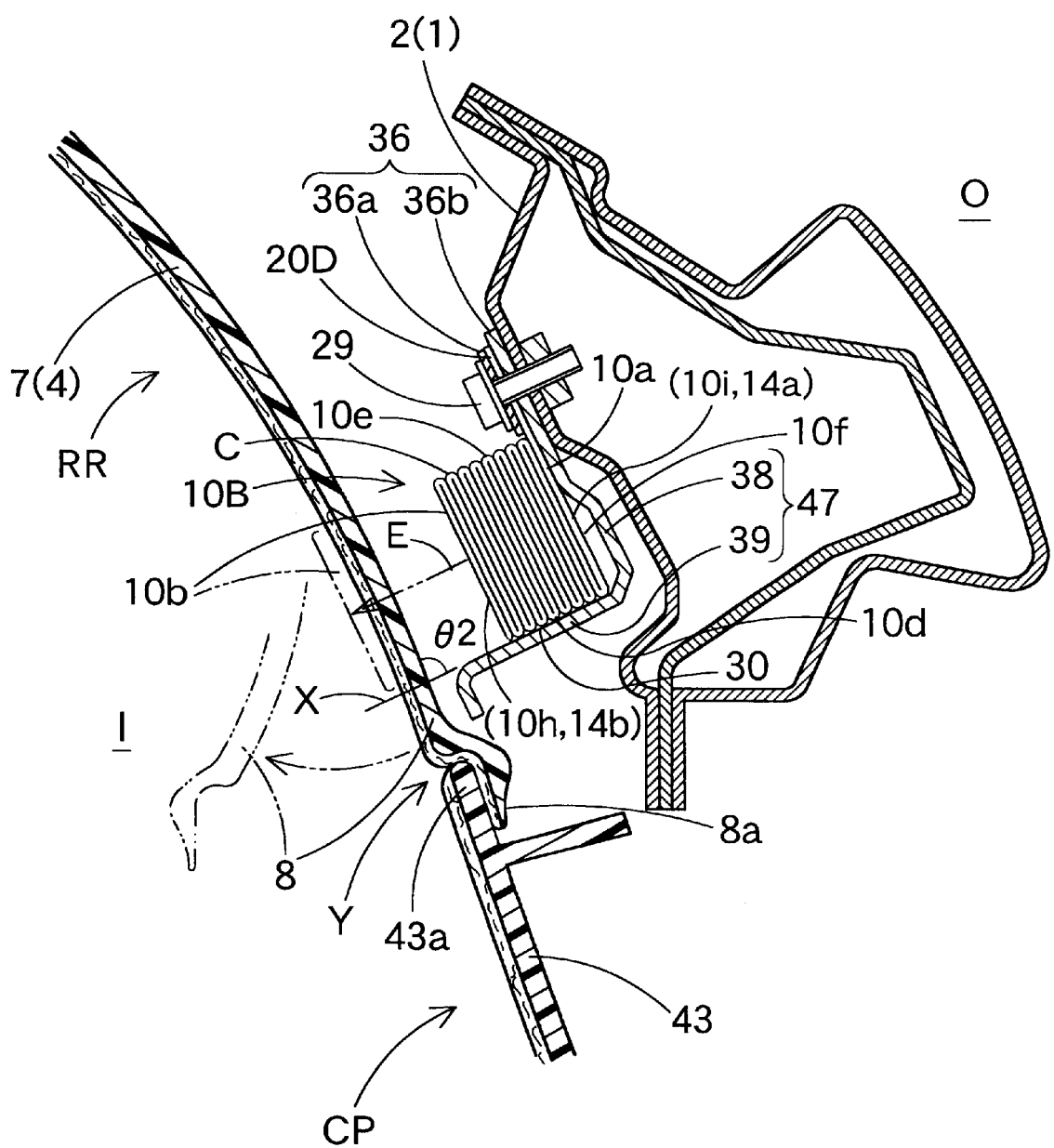
FIG. 8 is a schematic enlargement sectional view showing a modification of the first embodiment.

Further, in the first embodiment, in the air bag part 10B of the front side, as shown in FIG. 8, a restraining member 47 may be used. In the restraining member 47, the intersection angle θ2 between the extension line X of the guide surface 30 of the horizontal wall portion 39 and the lid 8 does not make an acute angle (made substantially 90°). In this case, in the part 10B of the air bag 10, similarly to the part 10A of the air bag 10, the folding state of the bellows fold is twisted. That is, the side of the upper edge 10a of the air bag 10 is made the side of the vertical wall portion 38, and the folds C are piled up along the guide surface 30 of the horizontal wall portion 39 from the vertical wall portion 38. In this state, part 10B may be housed at the vehicle's outer side O of the lid 8. In this case, the unfolding direction of the air bag part 10B is directed to the side of the lid 8. Thus, if the expanding gas flows into the part 10B, the volume of this part 10B expands along the guide surface 30 of the horizontal wall portion 39 to the vehicle's inner side I. More specifically, the part 10B immediately expands to the vehicle's inner side I, and pushes and opens the lid 8. At this time, the lower end 8a of the lid easily gets over the garnish upper end 43a. As a result, the part 10B pushes and opens the lid 8 without being caught by the horizontal wall portion 39, and smoothly projects to the vehicle's inner side I.

Incidentally, in the restraining member 47 shown in FIG. 8, the outer plate 36b of the attachment bracket 36 is not bent to the vertical wall portion 38. That is, the outer plate 36b is coupled to the vertical wall portion 38 in a flat plane state. In the restraining member 47, the guide surface 30 of the horizontal wall portion 39 at the upper plane side makes the direction of the downward extension line X to the side of the lid 8 directed to the upside from the parting portion Y (the direction going away from the pillar garnish 43).

Figure 9:
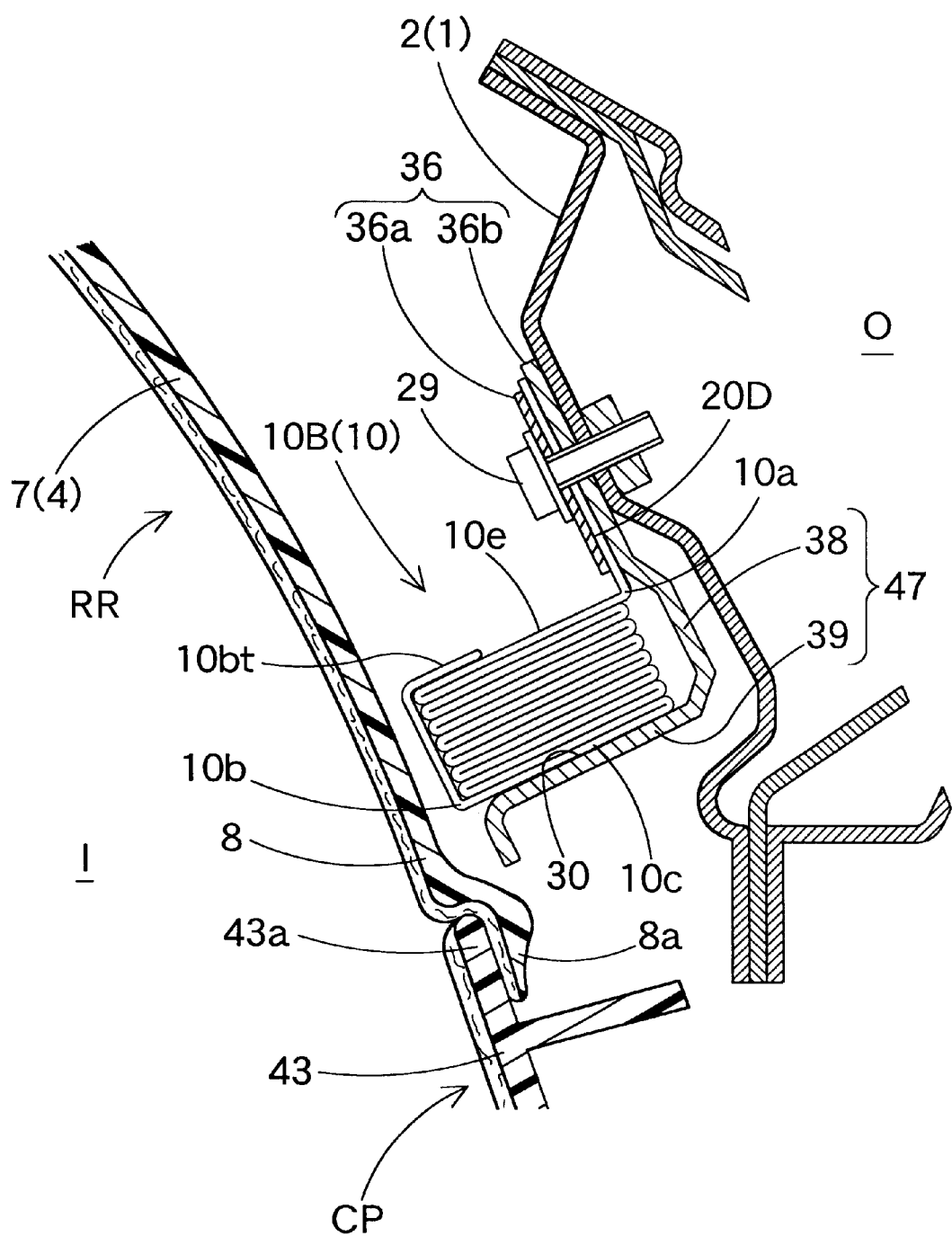
FIG. 9 is a schematic enlargement sectional view showing another modification of the first embodiment.

Further, as shown in FIG. 9, the part 10B of the air bag 10 disposed at the restraining member 47 of the front side may be housed in the restraining member 47 without twisting. This air bag part 10B is disposed such that the side of a tip end 10bt of the air bag lower edge 10b covers the upper portion 10e from the lower portion 10c of the folded air bag through the vehicle's inner side I.

In this case, when the expanding gas flows into part 10B of the air bag 10 and its volume expands, as shown in FIG. 10A, the winding at the side of the air bag's lower edge tip end 10bt loosens. Then the side of the air bag's lower edge tip end 10bt unfolds to the vehicle's inner side I, pushes and opens the lid 8, and projects to the vehicle's inner side I. At this time, even if the lid's lower end 8a is fastened to the upper end 43a of the center pillar garnish, the lower end 8a easily gets over the upper end 43a and the lid 8 opens. Thereafter, the part 10B of the air bag 10 projects from the opening of the opened lid 8 to the vehicle's inner side I. The part 10B follows the side of the air bag's lower edge 10b projecting to the vehicle's inner side I as if it is guided. Thus, the side of the lower edge 10b of the air bag 10 is not caught by the horizontal wall portion 39 and the part 10B smoothly projects to the vehicle's inner side I.

Incidentally, air bag 10 in the case shown in FIG. 9 is, as shown in FIG. 5, folded in the bellows fold in which it is folded substantially in the vertical direction from the flat unfolded state of the non-expansion state. The folds C parallel to the upper edge 10a are formed and the air bag 10 is folded in the bellows fold so that the side of the lower edge 10b approaches the side of the upper edge 10a. At that time, with respect to the whole of the side of the lower edge 10b, the side of the tip end 10bt is folded so as to cover the upper portion 10e from the lower portion 10c of the folded air bag through the vehicle's inner side I. Alternately, by the length of the air bag part 10B at the arrangement position of the restraining member 47, the side of the lower edge front end 10bt is folded so as to cover the upper portion 10e from the lower portion 10c of the folded air bag through the vehicle's inner side I. In the case where only the part 10B of the air bag covers the air bag 10 at the side of the lower edge tip end 10bt, it may be constructed as shown by the two-dot chain line of FIG. 4. More specifically, an extension portion 10g extending downward is provided at the lower edge 10b of the air bag 10. When the air bag 10 is folded, the extension portion 10g is wound around the air bag part 10B so as to cover the upper portion 10e from the lower portion 10c of the folded air bag through the vehicle's inner side I. The air bag assembly S may be formed in this way. The air bag part 10B is supported by the restraining member 47, and includes the lower edge tip end 10bt pushing the lid 8. Thus, part 10B has a more intensified force to push and open the lid 8 than general part 10C.

Figure 13:
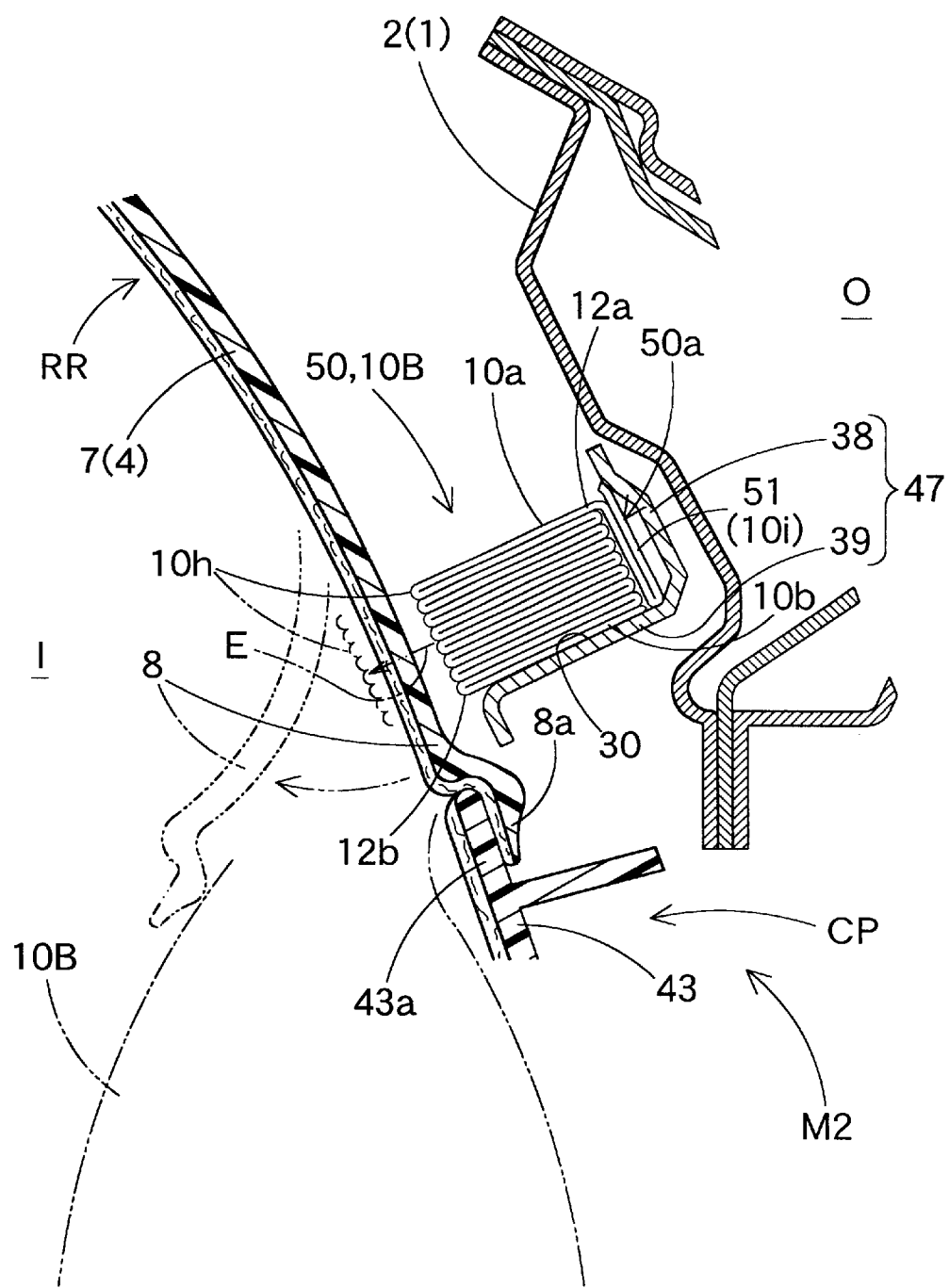
FIG. 13 is a schematic enlargement sectional view showing a use state of the second embodiment.

A second embodiment of the head protecting air bag apparatus M2 shown in FIG. 13 relates to an air bag 50. In expanding a part 10B disposed at the position of a restraining member 47, at the beginning of inflow of gas, part 10i in the vicinity of the side of a vertical wall portion 38 of the restraining member 47 expands. More specifically, in the air bag part 10B, part 10i expands and part 10h disposed at the side of a lid 8 moves, so that the lid 8 is opened.

Figure 11:
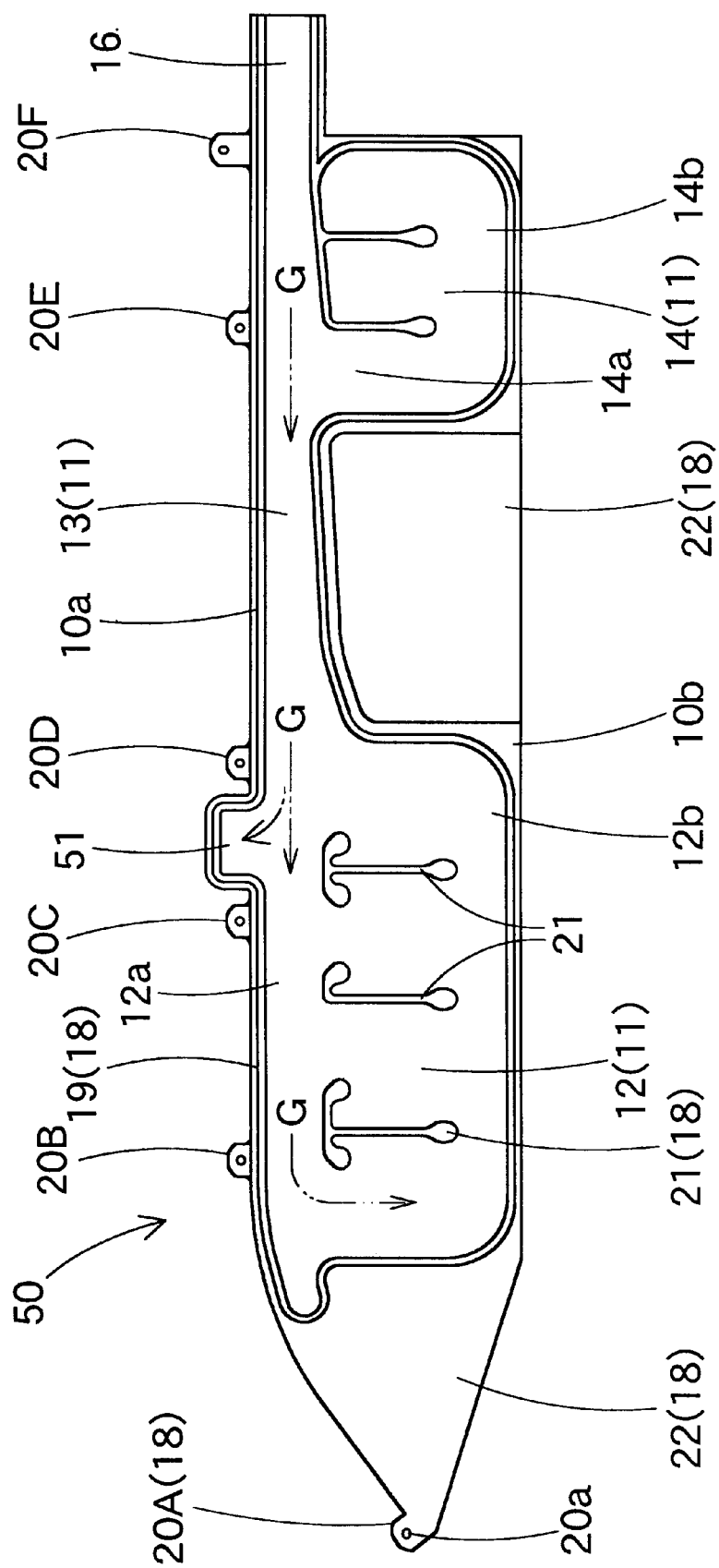
FIG. 11 is a front view showing an unfolded state of an air bag, used for a second embodiment, at the time of non-expansion.

In this air bag 50, as shown in FIGS. 11 and 13, a projection portion 51 forms at the side of an upper edge 10a and between attachment portions 20C and 20D in the air bag 50. An expansion portion 11 extends upward so that the projection portion 51 is formed. This projection portion 51 is disposed so as to face the side of the vertical wall portion 38 of the restraining member 47, and the air bag 50 folds. Incidentally, except for these differences, the air bag 50 is similar to that of the first embodiment. Thus, structural parts similar to the air bag 10 are designated by the same reference characters, and the explanation of the same parts are omitted.

Also, similar to the first embodiment, this head protecting air bag apparatus M2 is provided with an inflator 24, attachment brackets 25, 28, 31 and 36, restraining members 32 and 47, and an air bag cover 4 in addition to the air bag 50, and the explanation of those same members is omitted.

In this air bag 50, as shown in FIG. 11, similarly to the air bag 10, expanding gas G flows into the expansion portion 11 from the gas inflow portion 16 provided with the inflator 24. The gas G flows through the upper portion of the rear expansion portion 14 at the rear side, and flows to the side of the upper edge 12a of the front expansion portion 12 at the front side through the communicating portion 13. Thereafter, the gas G flows to the side of the lower edge 12b of the front expansion portion 12, and the entire front expansion portion 12 is expands. At the same time, the gas G flows from the side of the upper edge 14a of the rear expansion portion 14 to the side of the lower edge 14b, and the entire rear expansion portion 14 expands. As a result, the air bag 50 completely expands.

At the part 10B of the air bag 50 disposed at the position of the restraining member 47, the upstream side part of the expanding gas G becomes the side of the upper edge 12a of the front expansion portion 12. The downstream side part of the gas G becomes the side of the lower edge 12b of the front expansion portion 12. The projection portion 51 extends upward at the upstream side part 12a of the gas G.

Figure 12:
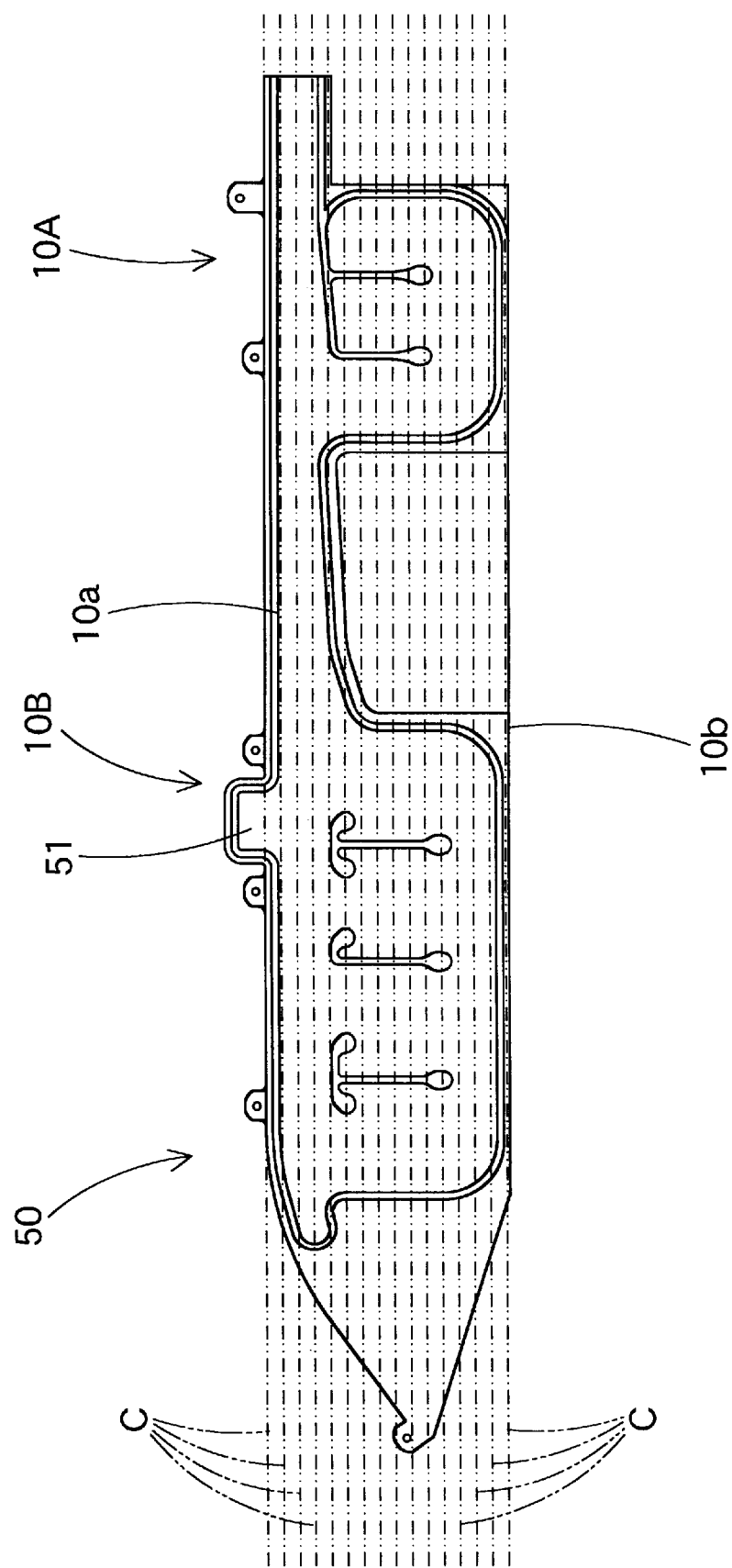
FIG. 12 is a view showing folds when the air bag of the second embodiment is folded.

Folding of this air bag 50 is performed, as shown in FIG. 12, in the bellows fold in which it is folded substantially in the vertical direction from a flat unfolded state of a non-expansion state. More specifically, the air bag 50 is folded in the bellows fold so that -the folds C parallel to the upper edge 10a are formed and the side of the lower edge 10b approaches the side of the upper edge 10a. At the projection portion 51, it is folded to be parallel to an end surface 50a of the folded air bag 50 at the vehicle's outer side O (see FIG. 13).

Thereafter, similar to the first embodiment, the air bag assembly is formed by winding the tape member T1, attaching the attachment brackets 28 and 36 to the attachment portions 20A, 20B, 20C and 20D, winding the tape member T3, twisting at the side of the gas inflow portion 16, attaching of the attachment bracket 31 to the attachment portions 20E and 20F, winding the tape member T2, inserting the inflator 24 into the gas inflow portion 16, and attaching of the attachment bracket 25. This air bag assembly S attaches to the body 1 by using the attachment bolts 26 and 29. Further, the garnishes 5, 41 and 43, and the roof interior member 7 are attached to the body 1. Then the head protecting air bag apparatus M2 can be mounted in the vehicle.

In this second embodiment of the head protecting air bag apparatus M2, when the gas expanding flows into the part 10B of the air bag 50 disposed at the position of the restraining member 47, the upstream side part 12a of the expanding gas, together with the projection portion 51, expands. However, the projection portion 51 (part 10i near the side of the vertical wall portion 38) is restrained by the vertical wall portion 38. Thus, the part (part 10h at the side of the lid 8) of the air bag 50 except the projection portion 51 moves along the horizontal wall portion 39 in the manner that allows it to be pushed by the expansion of the projection portion 51. Then the part 10h at the side of the lid pushes and opens the lid 8, and projects to the vehicle's inner side I. At this time, even if the lower end 8a of the lid is fastened to the garnish upper end 43a, the lower end 8a easily gets over the upper end 43a and the lid 8 opens. Thus, as indicated by a two-dot chain line of FIG. 13, both the upstream and downstream side parts 12a and 12b of the expanding gas smoothly expand and project to the vehicle's inner side I without being caught by the horizontal wall portion 39.

Of course, in this air bag 50, at the general part 10C except the parts 10A and 10B disposed at the position of the restraining members 32 and 47, similarly to the case shown in FIG. 3, the air bag is folded in the bellows fold so that it is folded substantially in the vertical direction. Then the general part 10C exists along the side window glass WG. Thus, the general part 10C projects downward along the side window glass WG when it unfolds and expands. By the downward force of the part 10C, the parts 10A and 10B of the air bag disposed at the positions of the restraining members 32 and 47 also project downward after projecting to the vehicle's inner side I. As a result, the air bag 50 smoothly covers the opening W of the vehicle's inner side I.

Thus, also in this second embodiment, even if the restraining member 47 used for restraining the downward projection of the part 10B of the air bag is disposed, it is possible to smoothly push and open the lid 8 and to unfold the part 10B.

Incidentally, as the air bag 50, there is a case where the communicating portion 13 of the air bag 50 extends toward the front side and obliquely downward, and communicates with the side of the lower edge of the front expansion portion 12. In that case, the lower edge side of the air bag 50 becomes the upstream side part 12b of the expanding gas. The upper edge side of the front expansion portion 12 becomes the downstream side part 12a of the expanding gas.

Thus, the projection portion 51 is provided at the side of the lower edge 12b, and when the air bag 50 is folded, the projection portion 51 is made to face the vertical wall portion 38 of the restraining member 47. That is, the projection portion 51 is disposed to be parallel to the end face 50a of the folded air bag 50 at the vehicle's outer side O.

Figure 14:
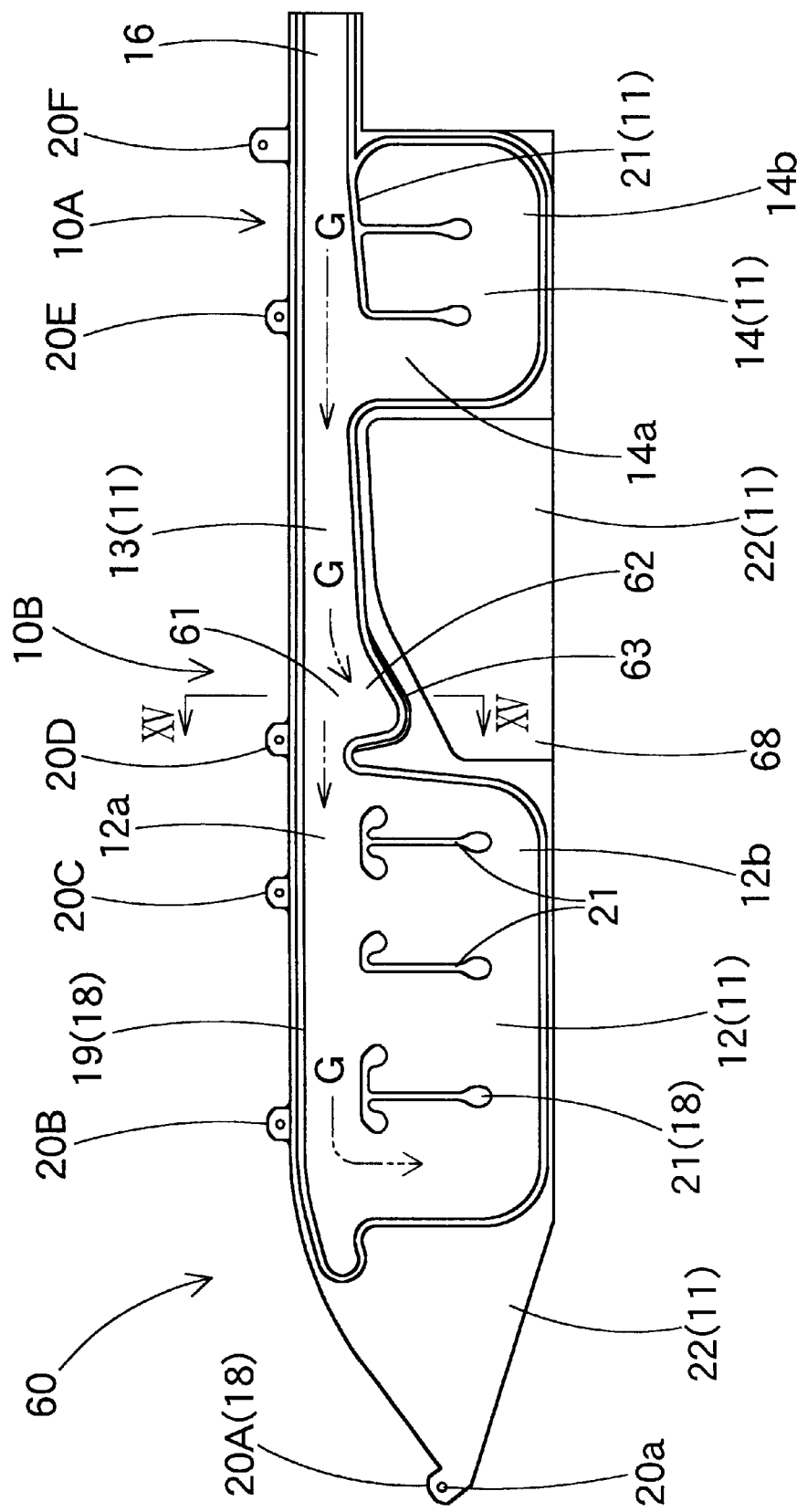
FIG. 14 is a front view showing an unfolded state of an air bag, used for a third embodiment, at the time of non-expansion.
Figure 15:
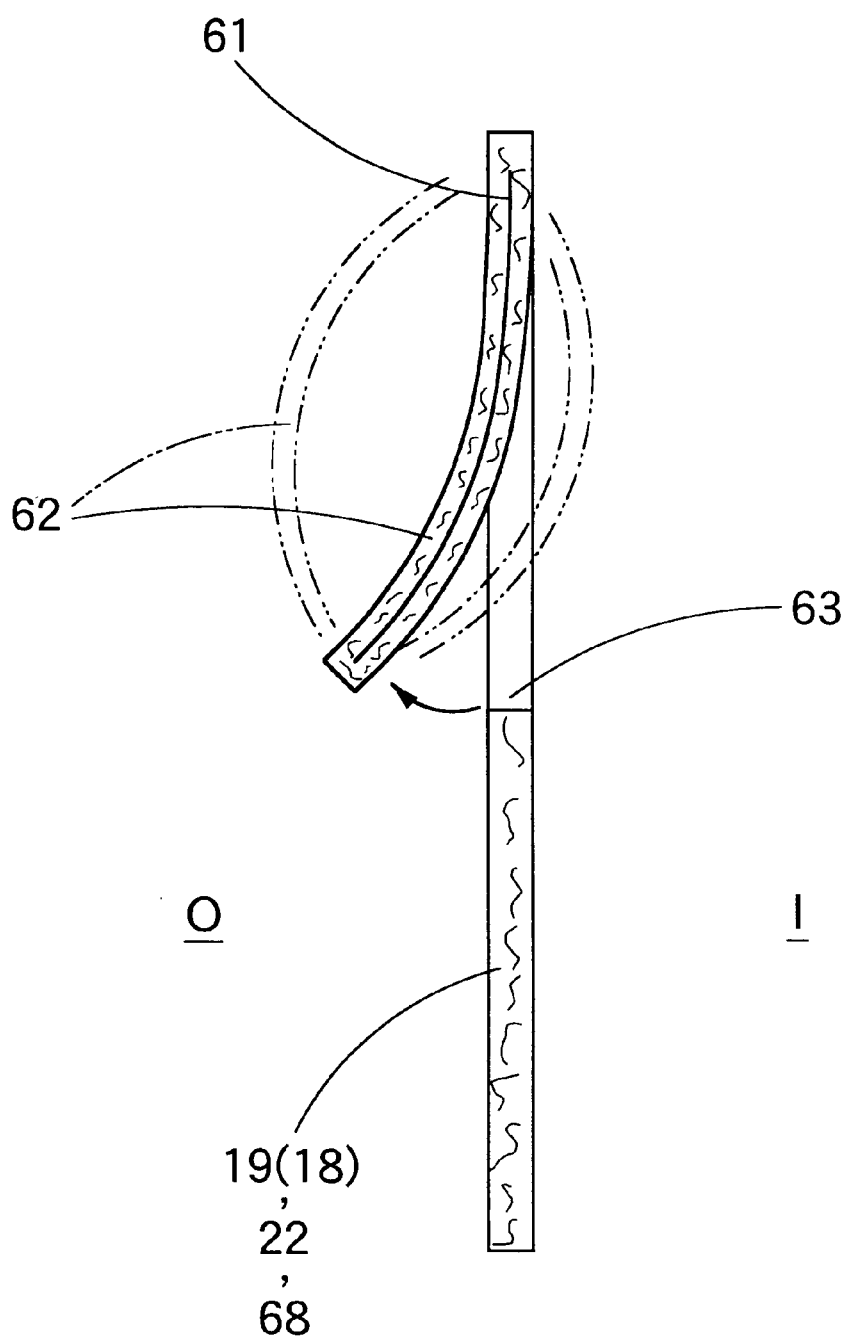
FIG. 15 is an enlargement sectional view of location XV—XV of FIG. 14.
Figure 16:
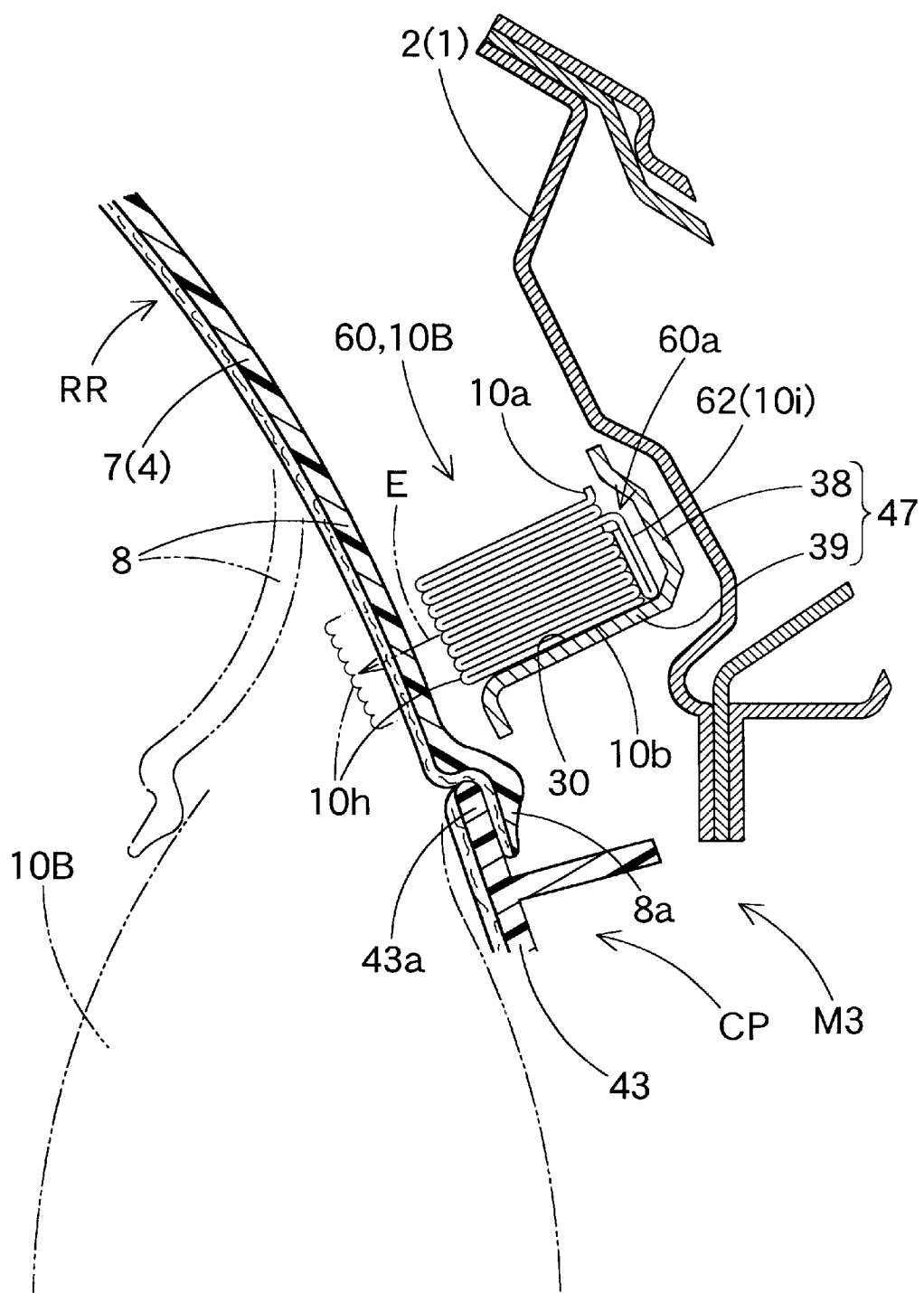
FIG. 16 is a schematic enlargement sectional view showing a use state of the third embodiment.

At the part 10B of the air bag disposed at the position of the restraining member 47, in the case where the part 10i of the restraining member 47 in the vicinity of the vertical wall portion 38 is expanded at the beginning of inflow of the expanding gas, an air bag 60 of a head protecting air bag apparatus M3 of a third embodiment shown in FIGS. 14 to 16 may be used.

In this air bag 60, as shown in FIGS. 14 and 15, an expansion portion 61 and a non-expansion portion 68 are provided at part 10B existing at the position of the restraining member 47. The expansion portion 61 is a part into which the expanding gas can glow, and the non-expansion portion 68 is a part into which the expanding gas can not flow. A cut piece portion 62 which can be bent toward the vehicle's outer side O is formed at the lower edge side of the expansion portion 61. The cut piece portion 62 is formed by providing a slit 63 in such a manner that the periphery of the lower edge side of the expansion portion 61 is cut away. Incidentally, the part of the expansion portion 61 is constituted by the front end side part of the communicating portion 13 communicating the front expansion portion 12 with the rear expansion portion 14 in the air bag 60. The part of the non-expansion portion 68 is constituted by a front end side downward peripheral portion 19 of the communicating portion 13 in the air bag 60 and a plate-like portion 22.

When the air bag 60 is folded, in a state where the cut piece portion 62 is moved to the vehicle's outer side, similar to the air bag 10 of the first embodiment, it is folded in the bellows fold. Thereafter, a tape member T1 is wound around the air bag 60. When the restraining member 47 is attached, as shown in FIG. 16, the cut piece portion 62 is made to face the vertical wall portion 38 of the restraining member 47. More specifically, the cut piece portion 62 is disposed at an end surface 60a of the folded air bag 60 at the vehicle's outer side O and the part 10B of the air bag is housed in the restraining member 47.

Also the air bag assembly S is formed if the attachment brackets 28 and 36 are attached to the attachment portions 20A, 20B, 20C and 20D, the tape member T3 is wound around the air bag is twisted at the side of the gas inflow portion 16, the attachment bracket 31 to the attachment portions 20E and 20F, are attached the tape member T2 is wound around inflator 24 is inserted into the gas inflow portion 16, and the attachment bracket 25 is attached. Subsequent mounting of the air bag assembly S to the vehicle is also similar to that of the air bag 50.

In the third embodiment of the head protecting air bag apparatus M3, after the apparatus is mounted in the vehicle and the expanding gas flows into the part 10B of the air bag 60 disposed at the position of the restraining member 47, the expansion portion 61, together with the cut piece portion 62 expands. However, the cut piece portion 62 (part 10i in the vicinity of the side of the vertical wall portion 38) is restrained by the vertical wall portion 38. Thus, except the cut piece portion 62, part 10h at the side of the lid 8 is pushed by the cut piece portion 62 and moves along the horizontal wall portion 39. The part 10h at the side of the lid 8 pushes and opens the lid 8, and projects to the vehicle's inner side I. At this time, even if the lower end 8a of the lid is fastened to the center pillar garnish upper end 43a, the lower end 8a easily gets over the upper end 43a and the lid 8 opens. Further, the cut piece portion 62, which expands from the beginning, near the side of the vertical wall portion 38 smoothly expands and projects to the vehicle's inner side I without being caught by the horizontal wall portion 39.

Thus, in the third embodiment of the head protecting air bag apparatus M3, even if the restraining member 47 used for restraining the downward projection of the part 10B of the air bag is disposed, the part 10B of the air bag still smoothly pushes and opens the lid 8, and unfolds.

Figure 17:
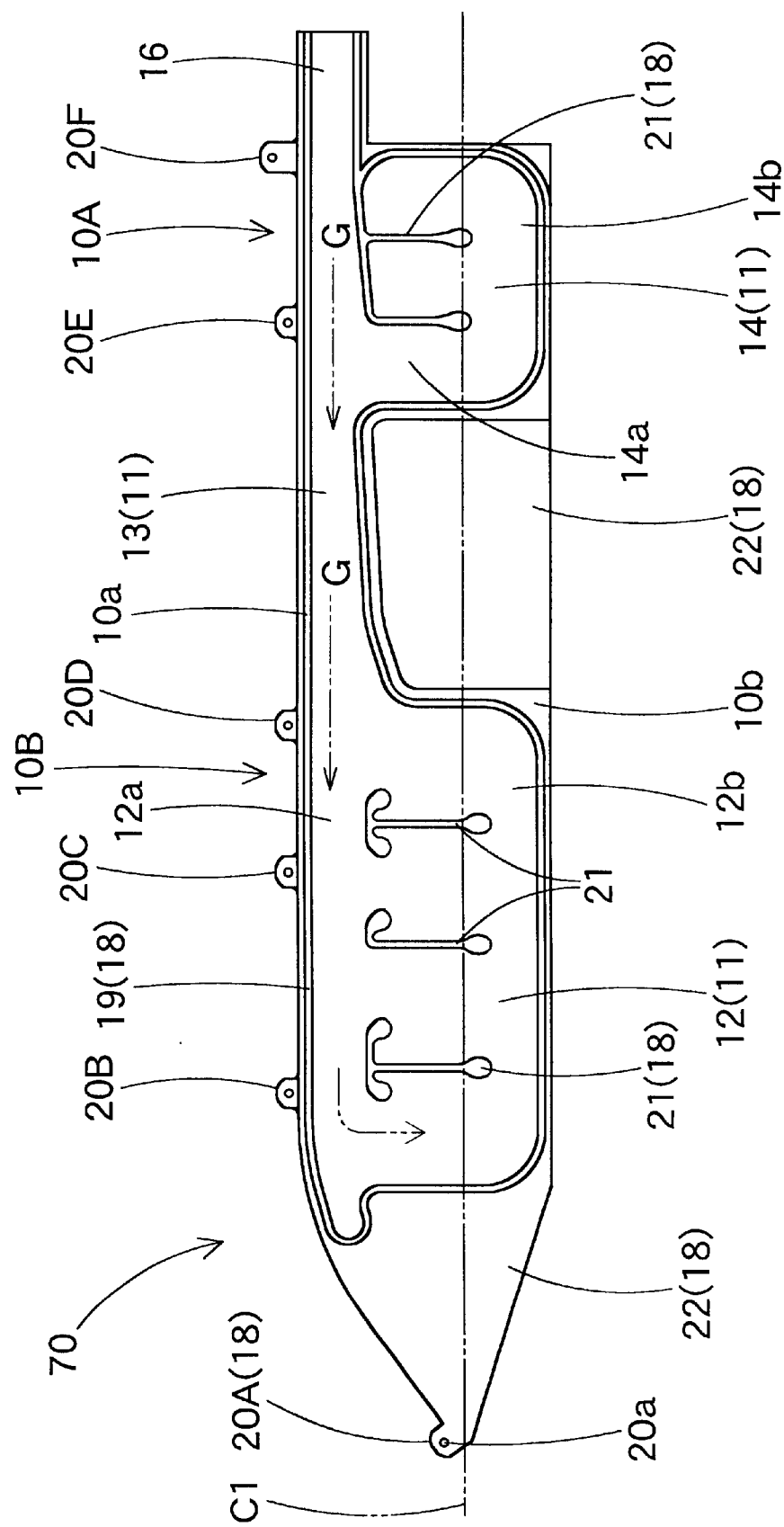
FIG. 17 is a front view showing a folded state of an air bag of a fourth embodiment and showing an unfolded state at the time of non-expansion.
Figure 18:
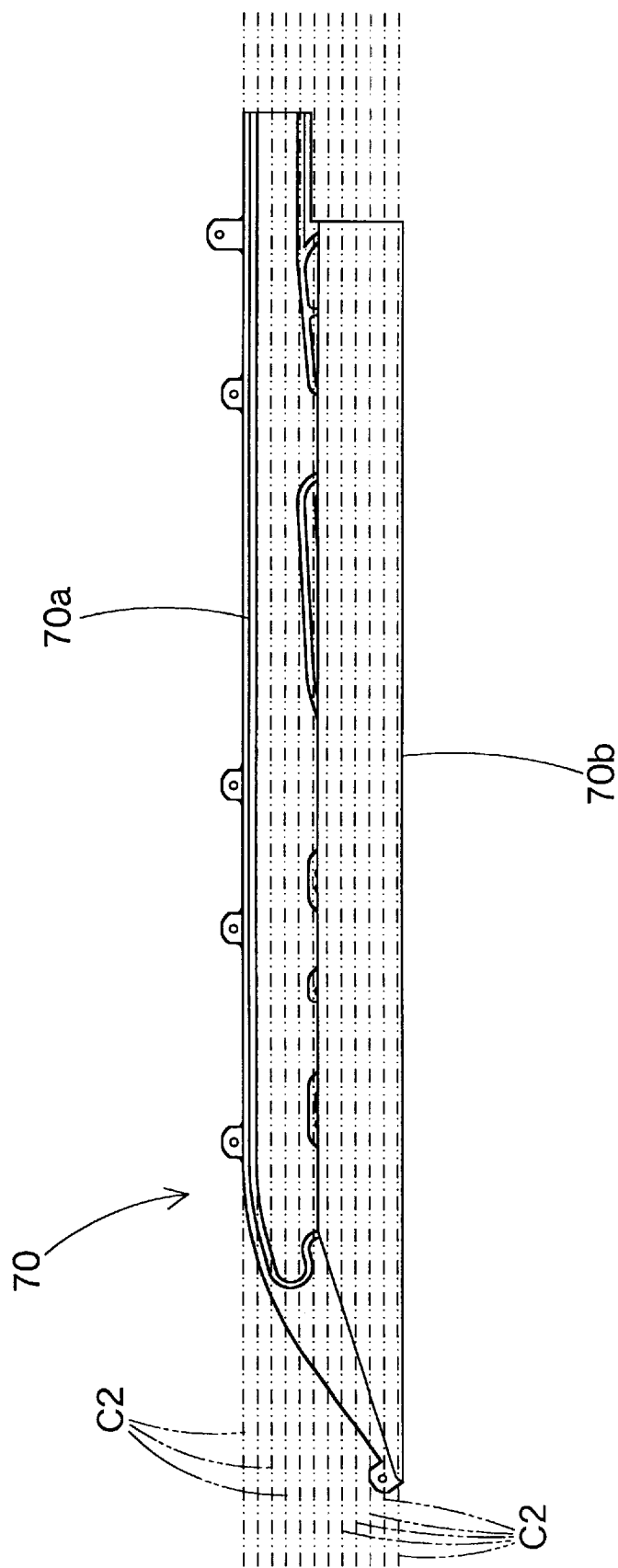
FIG. 18 is a front view showing a folded state of the air bag of the fourth embodiment and showing folds at a process after FIG. 17.
Figure 19:
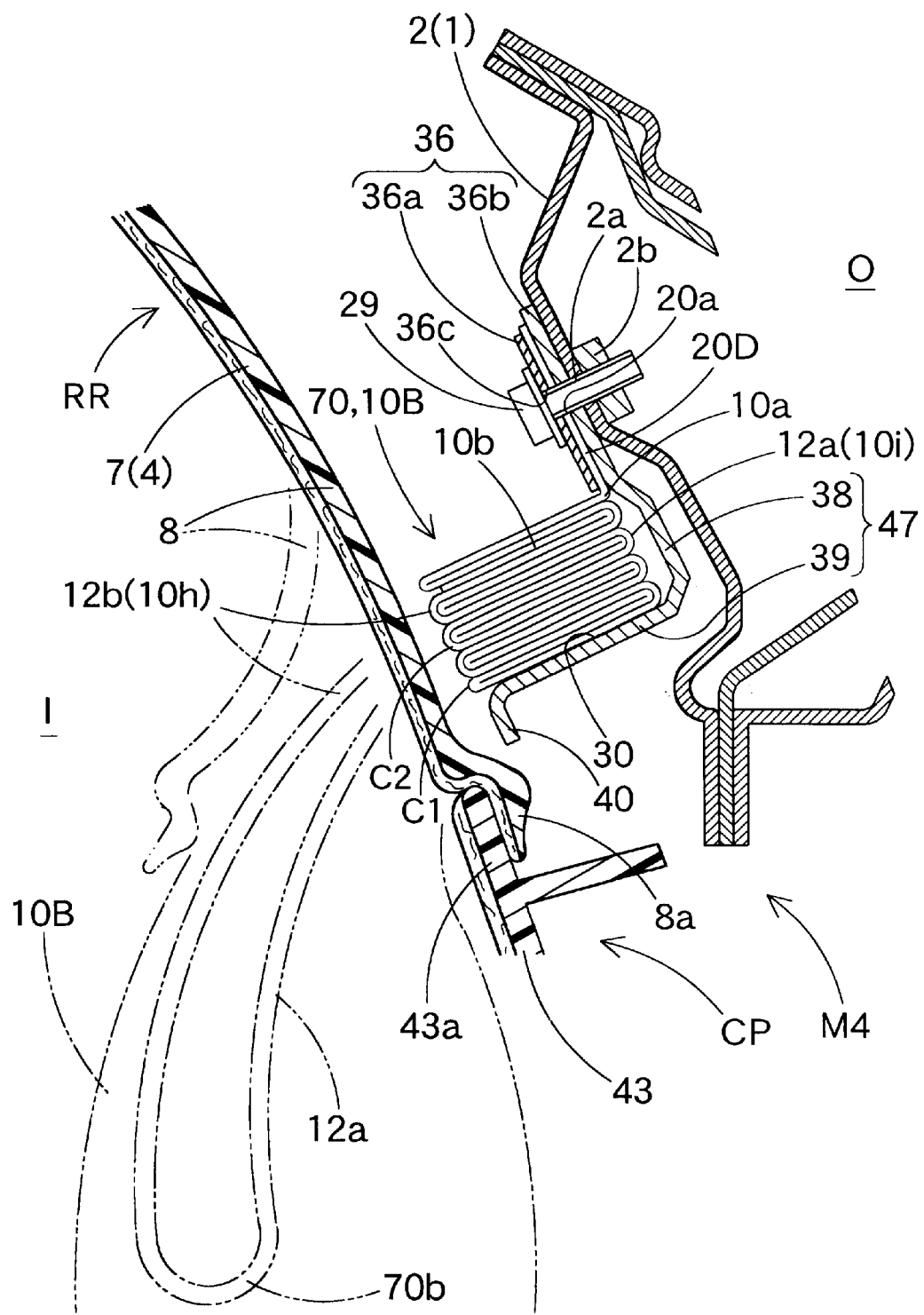
FIG. 19 is a schematic enlargement sectional view showing a use state of the fourth embodiment.

Further, at the part 10B disposed at the position of the restraining member 47, in the case where the part 10i of the restraining member 47 near the vertical wall portion 38 expands at the beginning of the inflow of the expanding gas, it may be folded like an air bag 70 used for a head protecting air bag apparatus M4 of a fourth embodiment shown in FIGS. 17 to 19.

This air bag 70 is the same as the first embodiment of the air bag 10. However, it differs from the first embodiment in the folding method, and further, it is housed in the restraining members 32 and 47 without twisting. Structural parts similar to those of the air bag 10 are designated by the same reference numbering, and the explanation of the same parts is omitted.

When the air bag 70 is folded, as shown in FIG. 17, from a flat unfolded and non-expanded state, it is folded in half in such a manner that the side of a lower edge 10b of the air bag 70 is folded back to the vehicle's inner side. At this time, a fold C1 parallel to an upper edge 10a is provided substantially at an intermediate position in the vertical direction. Thereafter, as shown in FIG. 18, folds C2 parallel to a folded upper edge 70a are provided, and the air bag is folded in the bellows fold in which it is folded substantially in the vertical direction. More specifically, the air bag 70 is folded in the bellows fold so that the side of a folded lower edge 70b approaches the side of the upper edge 70a.

After the air bag 70 is folded the air bag assembly is formed in the following way. The tape member T1 is wound, then the attachment brackets 28 and 36 are attached to the attachment portions 20A, 20B, 20C and 20D, and the tape member T3 is wound. Further, the attachment bracket 31 attaches to the attachment portions 20E and 20F without twisting the air bag 70, and the tape member T2 is wound. Thereafter, when the inflator 24 is inserted into the gas inflow portion 16, and the attachment bracket 25 is attached. When the air bag assembly S is subsequently mounted to the vehicle, it is similar to the air bag 10.

After mounting this fourth embodiment of the air bag apparatus M4, in the air bag 70, the part 10i disposed at the side of the vertical wall portion 38 of the restraining member 47 to the vehicle becomes the upstream side part 12a when the gas flows into the air bag. The part 10h at the side of the lid 8 becomes the downward side part 12b when the gas flows into the air bag.

Incidentally, the air bag 70, similar to the air bag 10, in the flat unfolded state, and in the part 10B disposed at the position of the restraining member 47, the upstream side part 12a at the time of the inflow of the expanding gas is disposed at the side of the upper edge 10a of the air bag. The downstream side part 12b at the time of the inflow of the expanding gas is disposed at the side of the lower edge 10b of the air bag.

In the fourth embodiment of the head protecting air bag apparatus M4, when the expanding gas flows into the part 10B of the air bag 70 disposed at the position of the restraining member 47, the upstream side part 12a of the expanding gas at the side of the vertical wall portion 38 expands. Thus, as indicated by a two-dot chain line of FIG. 19, the downstream side part 12b of the air bag 70 is pushed by the upstream side part 12a and moves along the horizontal wall portion 39. The downstream side part 12b pushes and opens the lid 8, and projects to the vehicle's inner side I. At this time, even if the lower edge 8a of the lid is fastened to the center pillar garnish upper end 43a, the lower end 8a easily gets over the upper end 43a and the lid 8 opens. As a result, in the air bag 10B, the fold is loosened, and both the upstream and downstream side parts 12a and 12b of the expanding gas smoothly expand and project to the vehicle's inner side I without being caught by the horizontal wall portion 39.

Thus, in the fourth embodiment of the head protecting air bag apparatus M4, even if the restraining member 47 for restraining the downward projection of the part 10B of the air bag 70 is disposed, it is possible to smoothly push and open the lid 8, and unfold part 10B of the air bag. Of course, in this air bag 70, similar to the air bag part 10B, the air bag part 10A of the restraining member 32 can also smooth unfold. The upstream side part 12a is disposed at the side of the vertical wall portions 33 and 38 in the state where the air bag parts 10B and 10A are supported by the restraining members 32 and 47. Thus, the air bag parts 10B and 10A have more of an intensified force to push and open the lid 8 than the general part 10C.

Incidentally, after mounting the air bag 70 to the vehicle, when part 10i disposed at the side of the vertical wall portion 38 of the restraining member 47 to the vehicle is made the upstream side part 12a at the time of the inflow of the expanding gas, and part 10h at the side of the lid 8 is made the downstream side part 12b when the expanding gas flows into the air bag, the structures shown in FIGS. 2 and 8 may be adopted. In this case, the air bag 10 is folded in the bellows fold described before. Then, only the parts 10A and 10B housed in the restraining members 32 and 47 are twisted, and the upstream side parts 12a and 14a at the time of the inflow of the gas for expansion are disposed at the side of the vertical wall portions 33 and 38 when the expanding gas flows into the air bag the downstream side parts 12b and 14b are disposed at the side of the lid 8.

Figure 20:
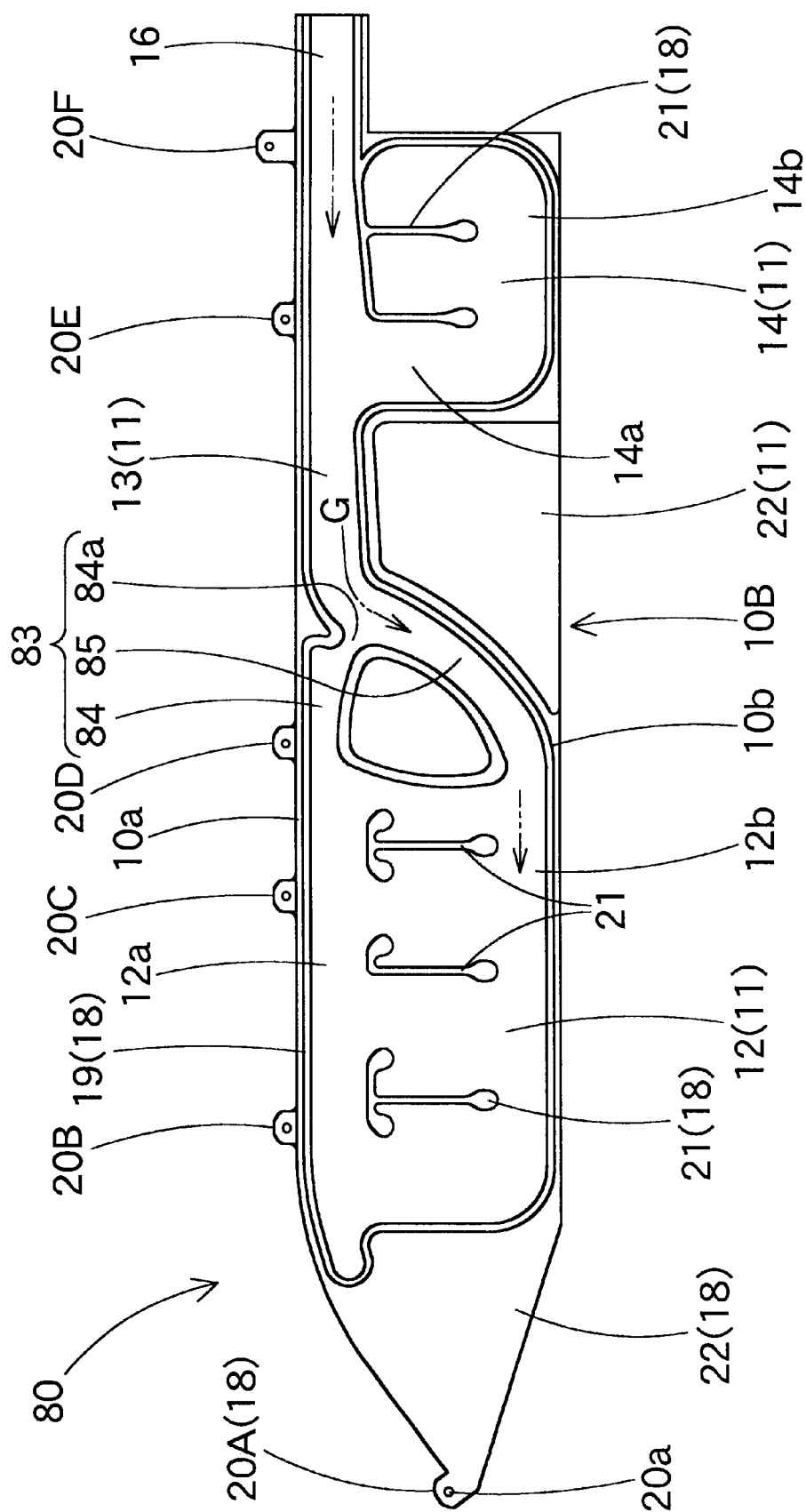
FIG. 20 is a front view showing an unfolded state of an air bag, used for a fifth embodiment, at the time of non-expansion.
Figure 21:
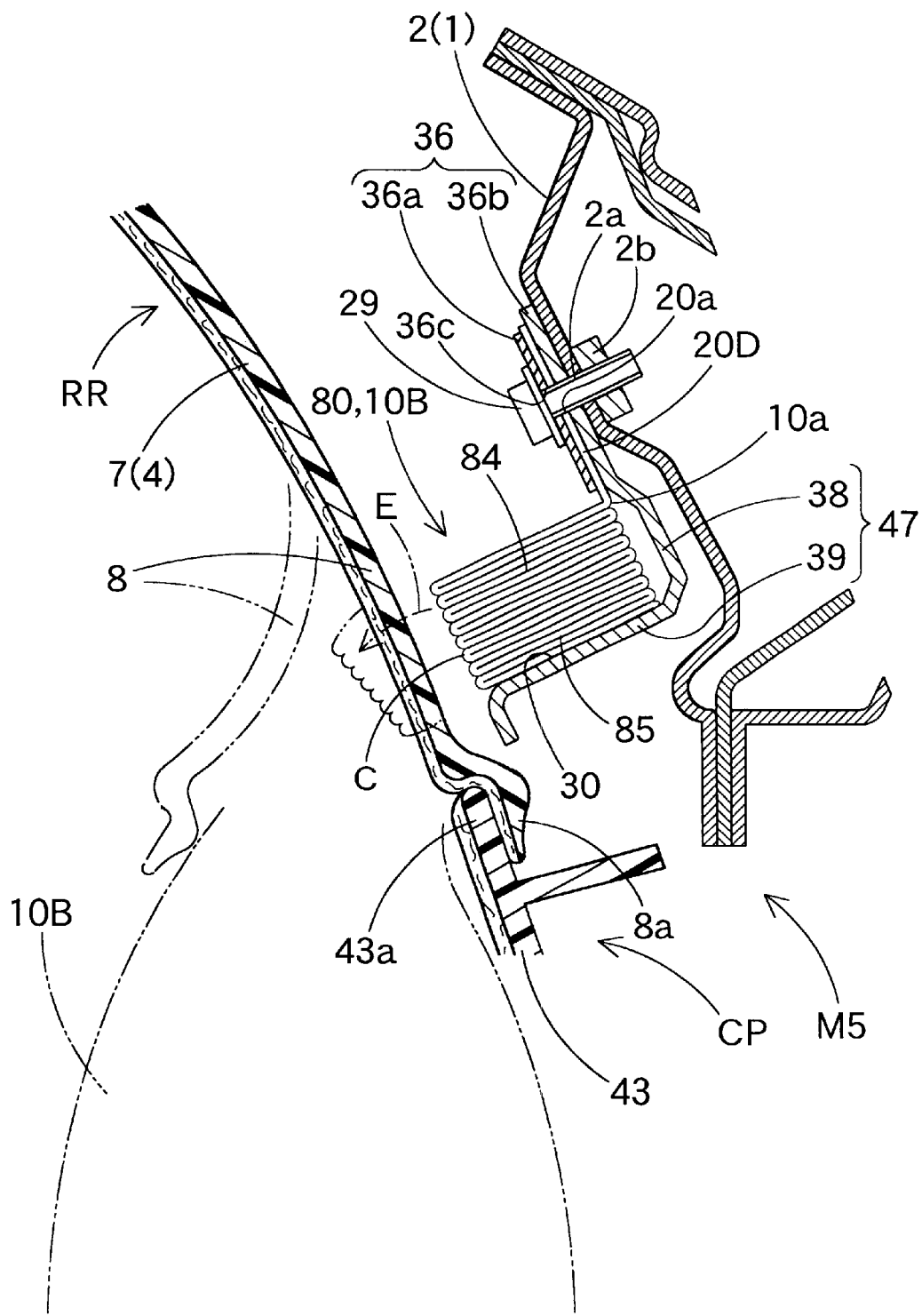
FIG. 21 is a schematic enlargement sectional view showing a use state of the fifth embodiment.

In the fifth embodiment of the head protecting air bag apparatus M5 shown in FIG. 21, with respect to an air bag 80 to be used, as shown in FIG. 20, a communicating portion 83 for supplying expanding gas to a front expansion portion 12 is bifurcated vertically. More specifically, the communicating portion 83 makes an upper edge side flow path 84 and a lower edge side flow path 85 existing at the side of an upper edge 10a and the side of a lower edge 10b of the air bag. Further, a reduced portion 84a in which an opening area is reduced is formed in the upper edge side flow path 84. By the reduced portion 84a, the flow rate of the expanding gas in the lower edge side flow path 85 is set larger than the flow rate of the expanding gas in the upper edge side flow path 84. Except for these points, the air bag 80 is similar to the first embodiment. Structural parts similar to those of the air bag 10 are designated by the same reference characters, and the explanation of the same parts is omitted.

Moreover, similar to the first embodiment, the head protecting air bag apparatus M5 has an inflator 24, attachment brackets 25, 28, 31 and 36, restraining members 32 and 47, and an air bag cover 4, in addition to the air bag 80. Explanation of the same members is omitted.

As shown in FIG. 20, the air bag 80 is folded in the bellows fold in which it is folded substantially in the vertical direction from a flat unfolded, non-expanded state, similar to the air bag 10. More specifically, the air bag 80 is folded in the bellows fold in such a manner that folds C parallel to the upper edge 10a are provided, and the side of the lower edge 10b approaches the side of the upper edge 10a.

Thereafter, similar to the first embodiment, the air bag assembly S is formed by winding of the tape member T1, attaching of the attachment brackets 28 and 36 to the attachment portions 20A, 20B, 20C and 20D, winding of the tape member T3, twisting at the side of the gas inflow portion 16, attaching of the attachment bracket 31 to the attachment portions 20E and 20F, winding of the tape member T2, inserting the inflator 24 into the gas inflow portion 16, and attaching the attachment bracket 25. Then this air bag assembly S is attached to the body 1 by using the attachment bolts 26 and 29, and further, the garnishes 5, 41 and 43, and the roof interior member 7 are attached to the body 1, so that the head protecting air bag apparatus M5 can be mounted in the vehicle.

In the head protecting air bag apparatus M5, when the expanding gas flows into the part 10B of the air bag disposed at the position of the restraining member 47, the volume of the lower edge side flow path 85 at the side of the horizontal wall portion 39 expands. Thus, the upper edge side flow path 84 is pushed up in the orthogonal direction to the horizontal wall portion 39. However, the attachment portions 20C and 20D at the side of the upper edge 10a of the air bag are attached to the inner panel 2 of the body 1, and the volume of the upper edge side flow path 84 is also slightly expanded. Thus, upward large movement is restrained, and the part 10B of the air bag is guided to the side of the lid 8 where the vertical wall portion 38 is not disposed. Then the part 10B of the air bag pushes and opens the lid 8, and projects to the vehicle's inner side I. At this time, even if the lower end 8a of the lid is fastened to the garnish upper end 43a, the lower end 8a easily gets over the upper end 43a and the lid 8 is opened. As a result, at the part 10B of the air bag 80 disposed at the position of the restraining member 47, both the upper edge and lower edge side flow paths 84 and 85 smoothly expand and project to the vehicle's inner side I without being caught by the horizontal wall portion 39.

Accordingly, in the fifth embodiment of the head protecting air bag apparatus M5, even if the restraining member 47 used for restraining the downward projection of the part 10B of the air bag 80 is disposed, it is possible to easily push and open the lid 8, and to unfold the part 10B of the air bag.

Figure 23:
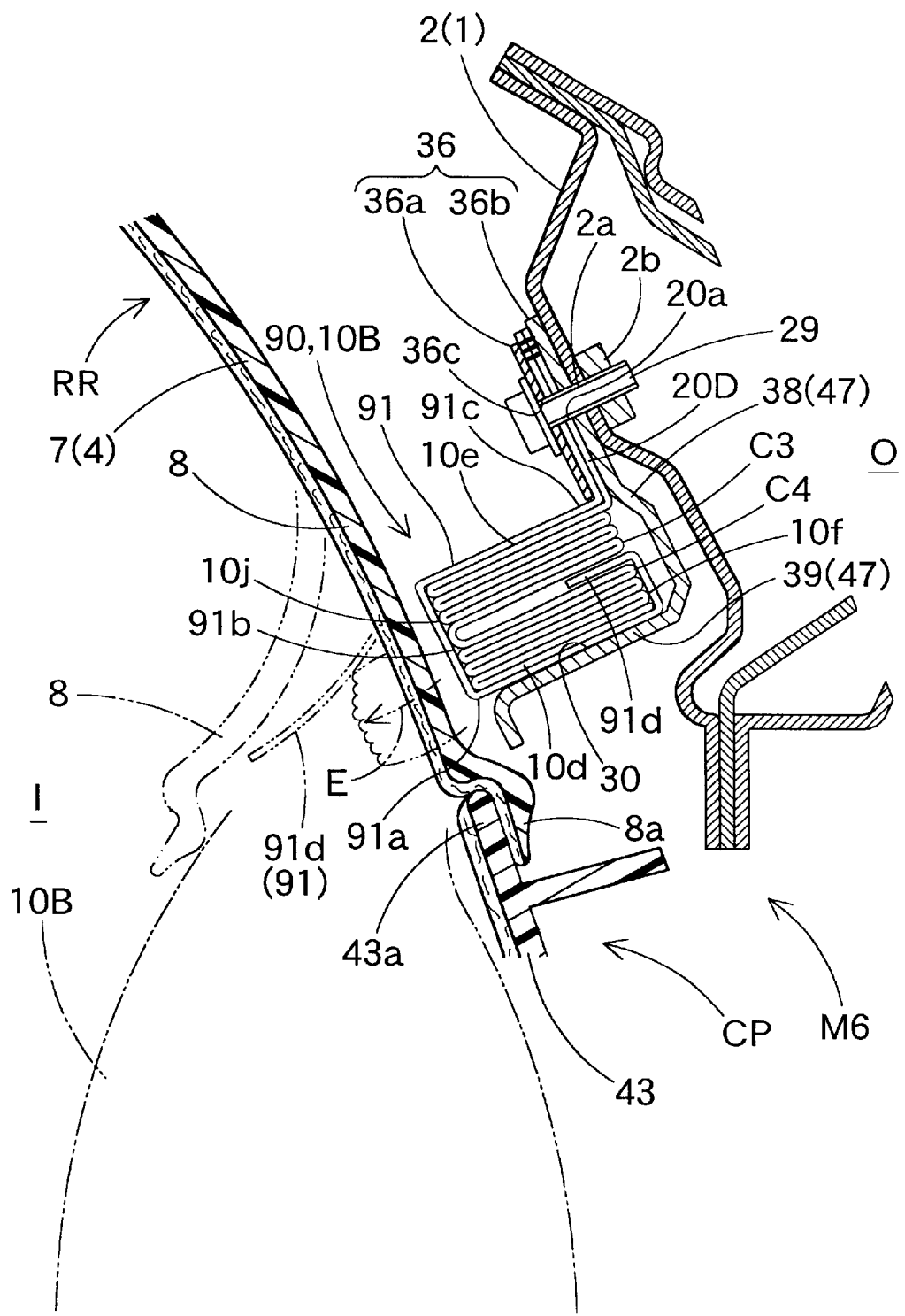
FIG. 23 is a schematic enlargement sectional view showing a use state of the sixth embodiment.

In the sixth embodiment of the head protecting air bag apparatus M6 shown in FIG. 23, with respect to an air bag 90 to be used, a part 10B of the air bag existing at a position of a restraining member 47 is wound around a wrapping sheet 91 and housed. Incidentally, the air bag 90 is similar to the air bag 10 of the first embodiment, and structural parts similar to those of the air bag 10 are designated by the same reference characters and the explanation of the same parts is omitted.

Figure 22:
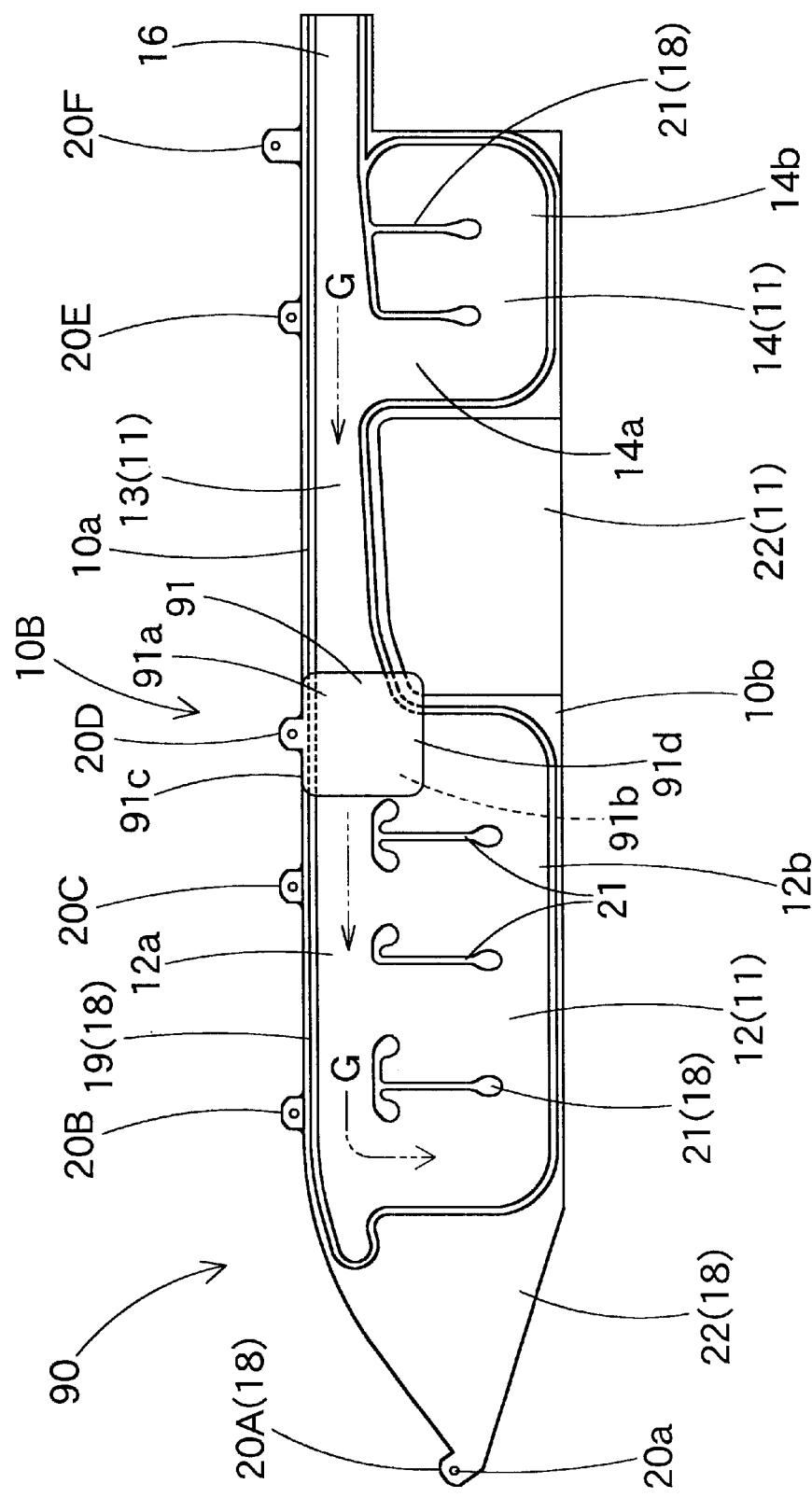
FIG. 22 is a front view showing an air bag of a sixth embodiment and an unfolded state at the time of non-expansion.

As shown in FIGS. 22 and 23, the upper end 91c of the w rapping sheet 91 is stitched and fixed to the vicinity of the attachment portion 20D at the upper edge 10a of the air bag 90. The length of the sheet 91 in the vertical direction is made of such a length that the part 10B of the folded air bag can be wrapped.

Further, with respect to the sheet 91, the frictional resistance of a front surface 91a at the vehicle's inner side I is made lower than that of a back surface 91b at the side of the air bag 90. In this embodiment, when the air bag 90 is formed in a hollow weave, the wrapping sheet 91 is formed by cutting out a part, which is woven into a sheet, into a predetermined shape. Then silicon coating is made at the side of the front surface 91a.

Incidentally, the head protecting air bag apparatus M6 is provided with an inflator 24, attachment brackets 25, 28, 31 and 36, restraining members 32 and 47, and an air bag cover 4, in addition to the air bag 90 and the wrapping sheet 91, and the explanation of the same members is omitted.

As shown in FIG. 22, similar to the air bag 10, the air bag 90 is folded in the bellows fold in which it is folded substantially in the vertical direction from a flat unfolded, non-expanded state. More specifically, the air bag 90 is folded in the bellows fold so that folds parallel to the upper edge 10a exist and the side of the lower edge 10b approaches the side of the upper edge 10a. At that time, the wrapping sheet 91 winds upon an end surface 10j of the part 10B of the folded air bag at the vehicle's inner side I and a lower end surface 10d. Further, the side of a lower end 91d is inserted between folds C3 and C4 near an intermediate portion of the folded air bag part 10B in the vertical direction at the vehicle's outer side O, and is held between the folds C3 and C4.

Thereafter, similar to the first embodiment, the air bag assembly is formed by winding the tape member T1, attaching attachment brackets 28 and 36 to the attachment portions 20A, 20B, 20C and 20D, winding the tape member T3, twisting at the side of the gas inflow portion 16, attaching the attachment bracket 31 to the attachment portions 20E and 20F, winding of the tape member T2, inserting the inflator 24 into the gas inflow portion 16, and attaching the attachment bracket 25. Then this air bag assembly S is attached to the body 1 by using the attachment bolts 26 and 29, and further, the garnishes 5, 41 and 43, and the roof interior member 7 are attached to the body 1, so that the head protecting air bag apparatus M6 can be mounted in the vehicle.

In the head protecting air bag apparatus M6, when the expanding gas flows into the part 10B of the air bag existing at the position of the restraining member 47 and its volume expands, the part is pushed up in the direction orthogonal to the horizontal wall portion 39. However, the attachment portion 20D at the side of the upper edge 10a of the air bag is attached to the inner panel 2 of the body 1, and the upward large movement is restrained. Thus, part 10B of the air bag is guided to the side of the lid 8 where the vertical wall portion 38 is not disposed. In the wrapping sheet 91, the frictional resistance of the front surface 91a brought into contact with the horizontal wall portion 39 is made lower than that of the back surface 91b brought into contact with the air bag 90. Thus, the part 10B of the folded air bag slides on the horizontal wall portion 39 while maintaining the state where the lower end 91d is held between the folds C3 and C4 at the vehicle's outer side O. The part 10B of the air bag is guided to the side of the lid 8 where the vertical wall portion 38 is not disposed, and pushes and opens the, lid 8, and projects to the vehicle's inner side I. At this time, even if the lower end 8a of the lid is fastened to the garnish upper end 43a, the lower end 8a easily gets over the upper end 43a and the lid 8 opens. Further, the lower end 91d of the sheet slips out from the portion between the folds C3 and C4 of the part 10B of the air bag, and the winding of the wrapping sheet 91 loosens. As a result, part 10B of the air bag smoothly expands and projects to the vehicle's inner side I without being caught by the horizontal wall portion 39.

Accordingly, in the sixth embodiment of the head protecting air bag apparatus M6, even if the restraining member 47 (used for restraining the downward projection of the part 10B of the air bag) is disposed, it is possible to smoothly push and open the lid 8 and unfold part 10B of the air bag.

Figure 24:
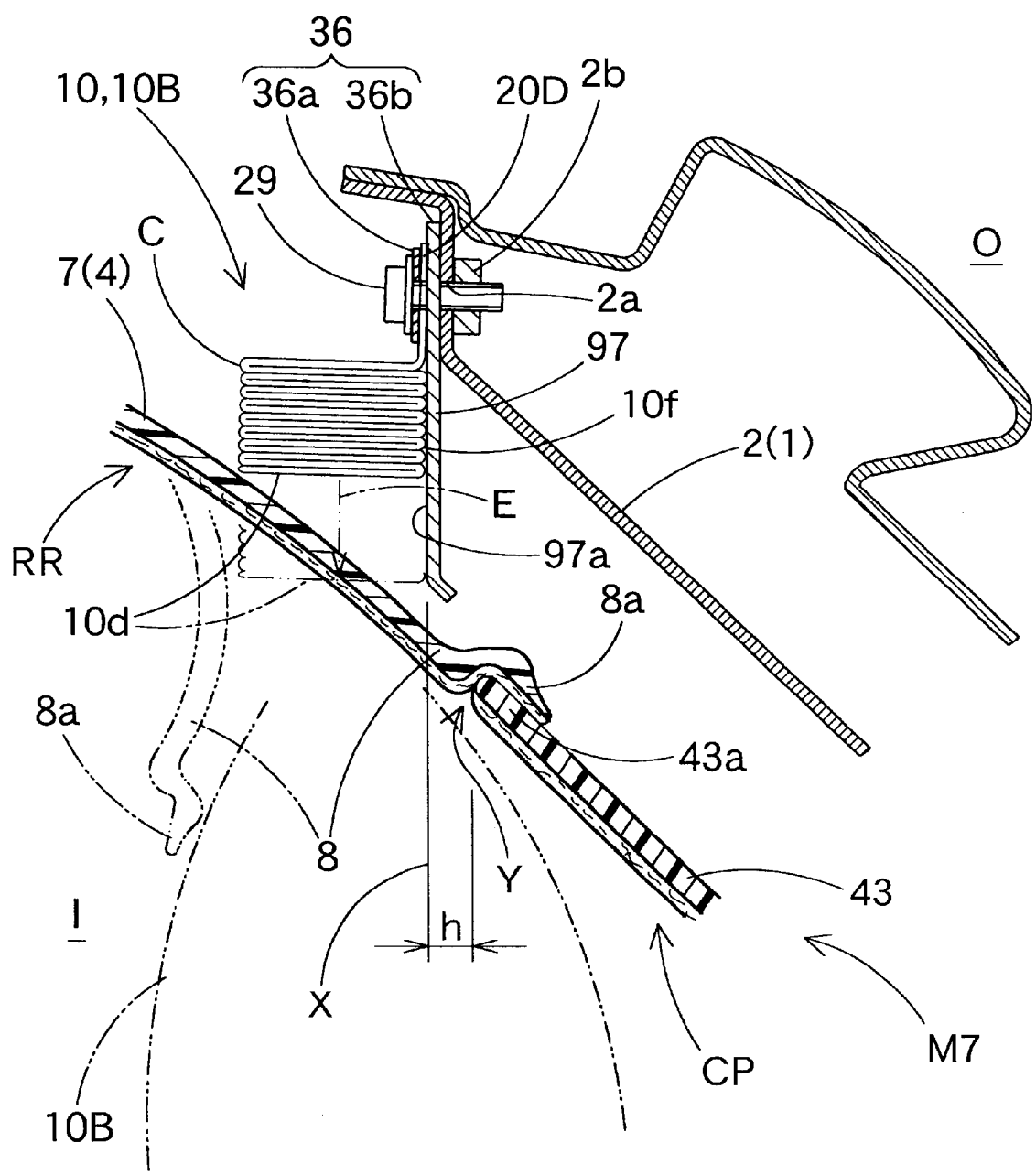
FIG. 24 is a schematic enlargement sectional view showing a use state of a seventh embodiment and corresponds to location XXIV—XXIV of FIG. 26.

FIG. 24 shows a head protecting air bag apparatus M7 of a seventh embodiment. In this air bag apparatus M7, a lid 8 at the lower end side of a roof interior member 7 is disposed to be directed obliquely downward to the vehicle's outer side O from the upside so that it is closer to the horizontal direction than to the vertical direction.

In the seventh embodiment of the head protecting air bag apparatus M7, a restraining member 97 is disposed over a center pillar garnish 43. The restraining member 97 is made of a metal plate, and is formed into such a substantially flat plate shape as to be constituted by only the vertical wall portion 38 of the restraining member 47. The upper end of the restraining member 97 is connected to an outer plate 36*b* of an attachment bracket 36. The outer plate 36*b* is fixed to an inner panel 2 by a bolt 29, so that the restraining member 97 is attached to the inner panel 2. The restraining member 97 exists substantially in the vertical direction, and it goes beyond the lower end face 10*d* of the folded air bag 10 and covers the air bag 10 at the vehicle's outer side O of the folded air bag 10. The surface 97*a* of the restraining member 97 at the vehicle's inner side I is disposed toward the vehicle's inner side I from a parting portion Y by a distance h. The parting portion Y is a boundary part at the vehicle's inner side I between the lower end 8*a* of the lid 8 and the upper end 43*a* of the center pillar garnish 43. The surface 97*a* at the vehicle's inner side becomes a guide surface for guiding the unfolding of the air bag 10. Thus, a downward extension line X of the guide surface 97*a* intersects with the lid 8 at a position above the parting portion Y.

Figure 26:
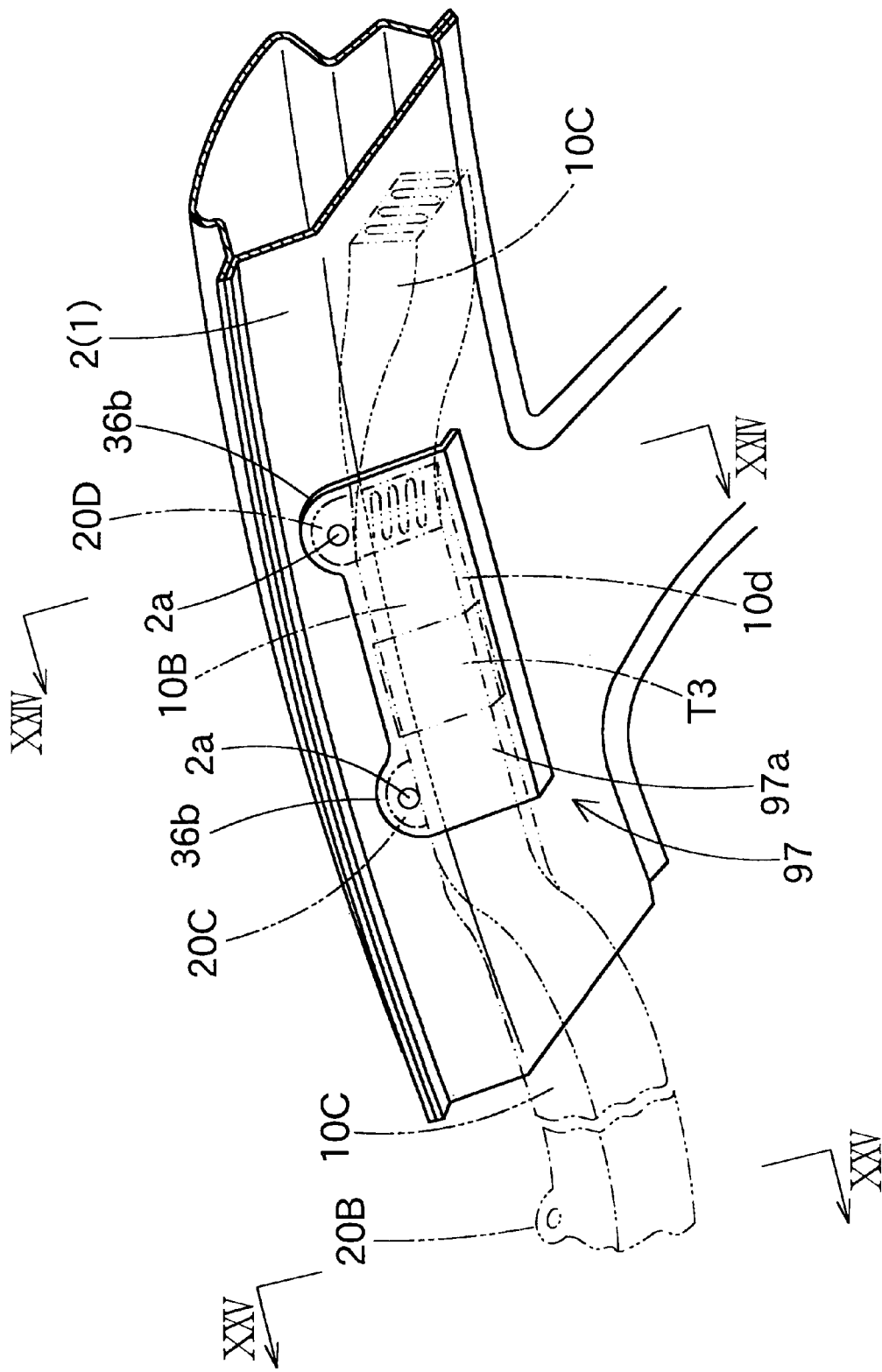
FIG. 26 is a schematic perspective view showing a state in which a restraining member of the seventh embodiment is disposed in an inner panel.

Incidentally, this head protecting air bag apparatus M7 differs from the first embodiment in both the inclination of the lid 8 near the center pillar garnish upper end 43*a* and in the shape of the inner panel 2 (see FIG. 26). Also, the air bag apparatus M7 differs from the first embodiment in the already described restraining member 97. However, the air bag apparatus M7 is similar to the first embodiment in other members including the air bag 10. Similar to the first embodiment, the air bag apparatus M7 has the air bag 10, the inflator 24, the attachment brackets 25, 28, 31 and 36, the rear side restraining member 32, and the air bag cover 4, and those illustrated parts are designated by the same reference characters and the explanation is omitted.

In this seventh embodiment, similar to the first embodiment, the air bag 10 is first folded in the bellows fold, and the tape member T1 is wound around the air bag 10. Next, the attachment brackets 28 and 36 are attached to the attachment portions 20A, 20B, 20C and 20D. Further, the tape member T3 (see FIG. 26) is wound around the periphery of the part of the restraining member 97 together with the air bag 10. Thereafter, the side of the gas inflow portion 16 is twisted, and the attachment bracket 3 is attached to the attachment portions 20E and 20F, and the tape member T2 is wound around the periphery of the restraining member 32 together with the air bag 10. Next, the inflator 24 is inserted into the gas inflow portion 16, and further, the attachment bracket 25 is attached, so that an air bag assembly S is formed. This air bag assembly S is attached to the body 1 by using the attachment bolts 26 and 29, and further, the garnishes 5, 41 and 43, and the roof interior member 7 are attached to the body 1, so that the head protecting air bag apparatus M7 can be mounted in the vehicle.

Figure 25:
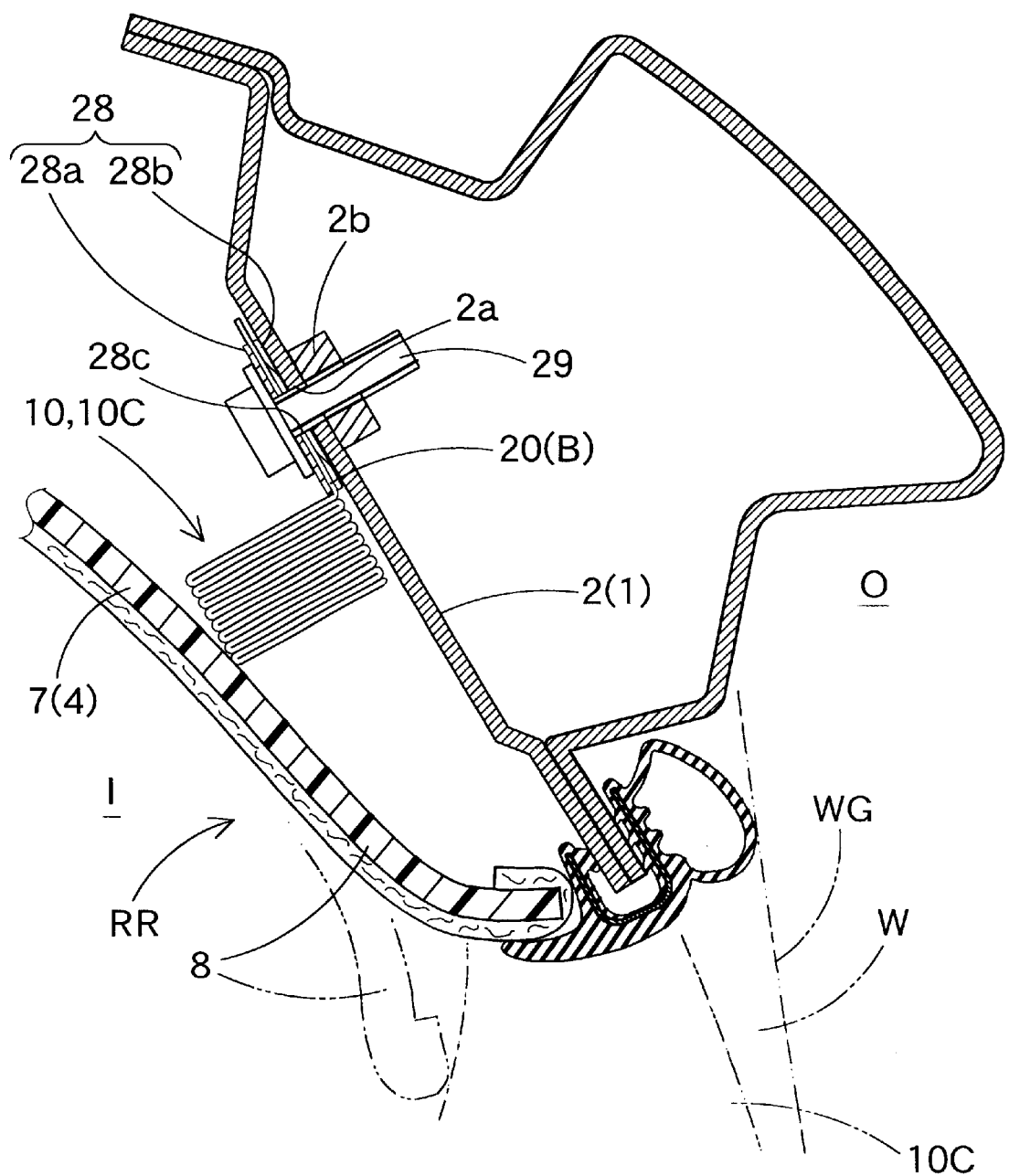
FIG. 25 is a schematic enlargement sectional view showing a use state of a general part of an air bag of the seventh embodiment and corresponds to location XXV—XXV of FIG. 26.

Incidentally, the general part 10C of the air bag 10 at both sides of the center pillar portion CP is, as shown in FIG. 25, folded substantially in the vertical direction and is folded in the bellows fold. Thus, after mounting in the vehicle, the general part 10C folds in the oblique direction along the side window glass WG. On the other hand, in the part 10B of the air bag at the restraining member 97, as shown in FIG. 24, it is twisted and folds direction is made the vertical direction. The part 10B of the air bag is supported so that the end surface 10*f* of the air bag at the vehicle's outer side comes in contact with the guide surface 97*a* of the restraining member 97. Further, in the part 10B of the air bag, the unfolding direction E intersects with the surface of the lid 8 at the vehicle's outer side O at substantially right angles in the state where the lower end surface 10*d* is opened. The lower end surface 10*d* is made to face the surface of the lid 8 at the vehicle's outer side O.

In this seventh embodiment of the head protecting air bag apparatus M7, the restraining member 97 is shaped into the substantially flat plate shape and exists substantially in the vertical direction. Further, the restraining member 97 goes beyond the lower end surface 10*d* and covers the vehicle's outer side end surface 10*f* of the folded air bag 10. In the air bag 10, the attachment portion 20 at the side of the air bag upper edge 10*a* is attached to the inner panel 2 of the body 1, so that large upward movement is restrained. Thus, when the expanding gas flows into the part 10B of the air bag disposed at the position of the restraining member 97 and its volume expands, it protrudes to the lower side along the guide surface 97*a* of the restraining member 97 at the vehicle's inner side. The guide surface 97*a* of the restraining member 97 is positioned closer to the vehicle's inner side I than the parting portion Y. Thus, the part 10B of the air bag does not interfere with the pillar garnish upper end 43*a*, that is, it does not intrude into the part of the pillar garnish 43 at the vehicle's outer side (back surface side), and as indicated by a two-dot chain line of FIG. 24, it pushes the lower end 8*a* of the lid to the vehicle's inner side I. As a result, the lower end 8*a* of the lid easily gets over the pillar garnish upper end 43*a,* the lid 8 opens, and part 10B of the air bag smoothly protrudes to the vehicle's inner side I.

Of course, the general part 10C other than the parts 10A and 10B disposed at the positions of the restraining members 32 and 97 is, as shown in FIG. 25, disposed along the side window glass WG. Thus, the general part 10C projects to the obliquely downward side at the vehicle's outer side O along the side window glass WG when it unfolds and expands. By the downward force of the general part 10C, the parts 10A and 10B of the air bag disposed at the positions of the restraining members 32 and 97 also project downward along the side window glass WG after projecting to the vehicle's inner side I. As a result, the air bag 10 smoothly covers the opening W at the vehicle's inner side I.

Accordingly, also in this seventh embodiment, even if the restraining member 47 for restraining the downward projection of the part 10B of the air bag is disposed, it is possible to smoothly push and open the lid 8 and to unfold the part 10B of the air bag.

Figure 27:
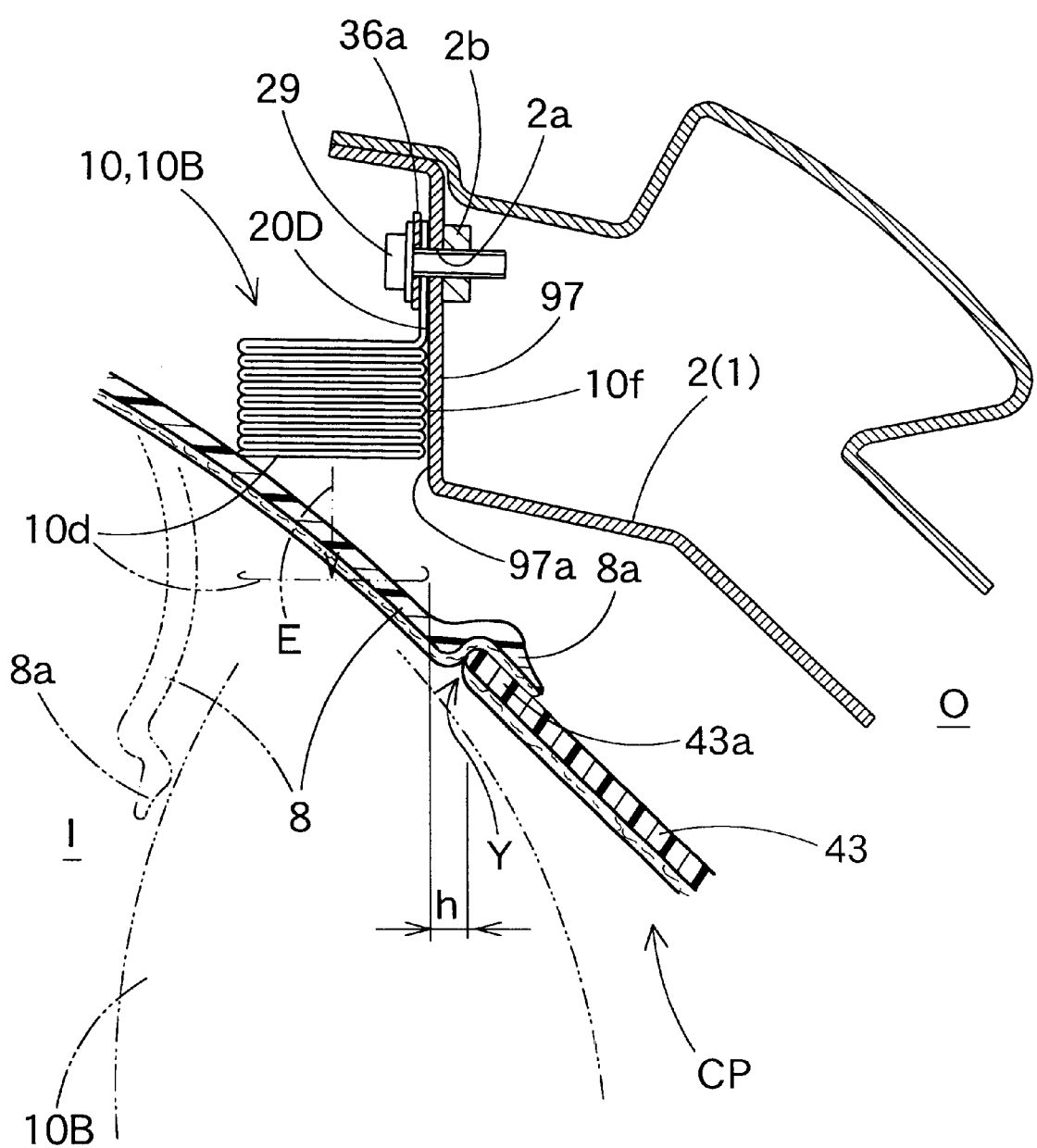
FIG. 27 is a schematic enlargement sectional view showing a modification of the seventh embodiment.
Figure 28:
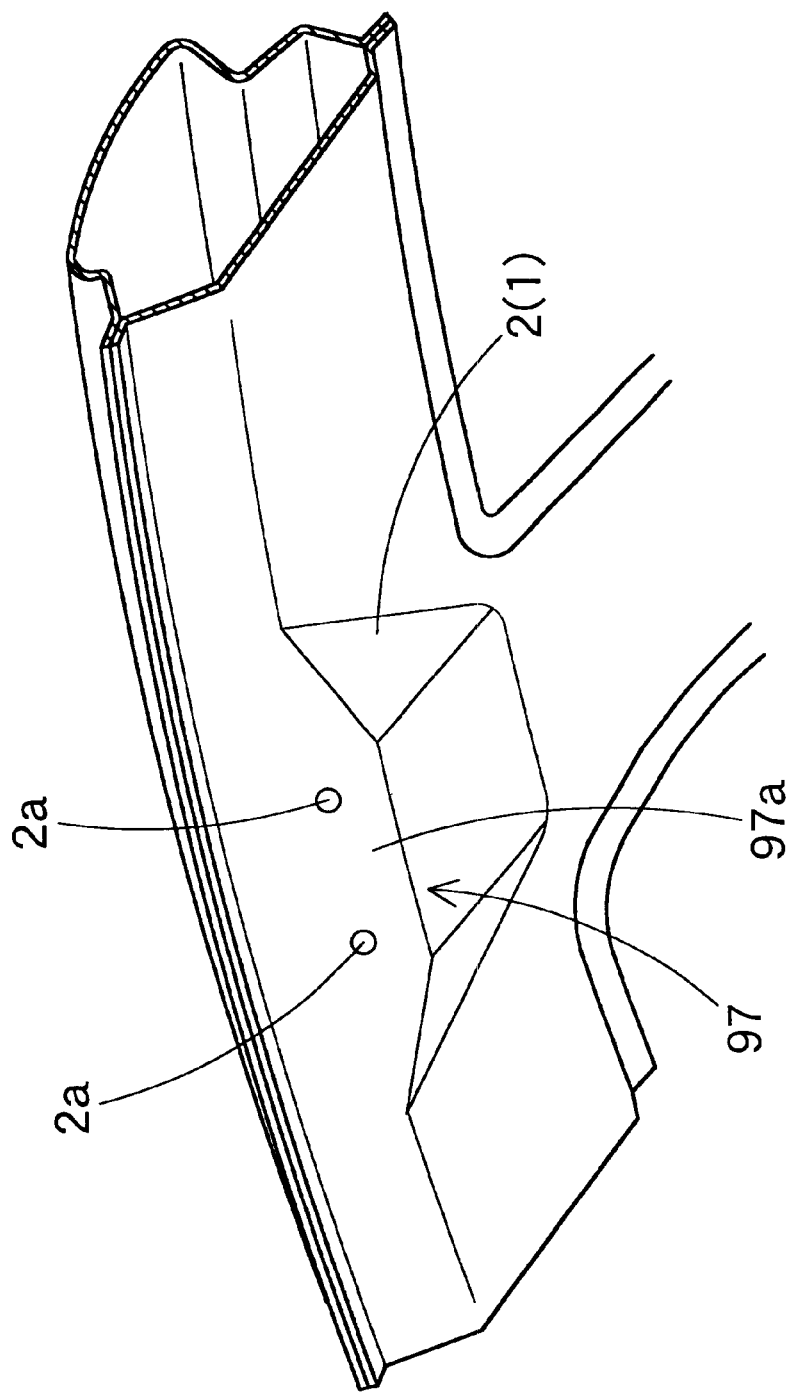
FIG. 28 is a schematic enlargement sectional view showing an inner panel of a modification of the seventh embodiment.

Incidentally, in the seventh embodiment, the description has been made on the case where the restraining member 97 is constructed by a member separate from the inner panel 2. However, as shown in FIGS. 27 and 28, the restraining member 97 may be formed integrally with the inner panel 2 at the side of the body 1. Like this, if the part of the restraining member 97 is formed in the inner panel 2 itself, the number of parts of the air bag apparatus M7 can be reduced resulting in a reduced cost for the air bag apparatus M7.

Incidentally, to form the restraining member integrally with the inner panel 2 at the side of the body 1 may be applied to the restraining members 32, 37 and 47 of the first through sixth embodiments. More specifically, these restraining members 32, 37, and 47 may be formed integrally with the inner panel 2.

When the airbag parts 10A and 10B unfold and expand, it will not intrude into the vehicle's outer side O of the garnishes 41 and 43 if the unfolding direction E is directed to the side of the lid 8 by twisting the parts from the general part 10C. This is shown in air bag parts 10A and 10B of an eighth embodiment in FIGS. 29 and 30. More specifically, the restraining members 32, 37, 47 and 97 may not be disposed. In this case, the unfolding direction E is directed to the side of the lid 8 so that the parts 10A and 10B of the air bag have more intensified forces to push and open the lid 8 than the general part 10C. Incidentally, similar to FIG. 3, although the general part 10C is directed to the side of the lid 8, the force to push the lid 8 is not made higher than that of the parts 10A and 10B of the air bag. That is, the unfolding direction E of the parts 10A and 10B of the air bag intersects with the lid 8 at substantially right angles. On the other hand, the unfolding direction E of the general part 10C does not intersect with the lid 8 at substantially right angles, but is made parallel to the side window glass WG. Incidentally, in the case of the embodiments, the air bag is folded in the bellows fold, and the unfolding direction E of each of the parts 10A, 10B and 10C is coincident with the folding direction of the air bag 10.

Also in this eighth embodiment, similar to the first embodiment, the air bag 10 is folded in the bellows fold, and the tape member T1 is wound around the air bag 10. The air bag assembly is formed by attaching brackets 28, 31 and 36 to the attachment portions 20A, 20B, 20C, 20D, 20E and 20F. Thereafter, the side of the gas inflow portion 16 is twisted, the inflator 24 is inserted into the gas inflow portion 16, and further, the attachment bracket 25 is attached. This air bag assembly S is attached to the body 1 by using the attachment bolts 26 and 29, and further, the garnishes 5, 41 and 43, and the roof interior member 7 is attached to the body 1, so that the head protecting air bag apparatus M8 can be mounted in the vehicle.

Figure 29:
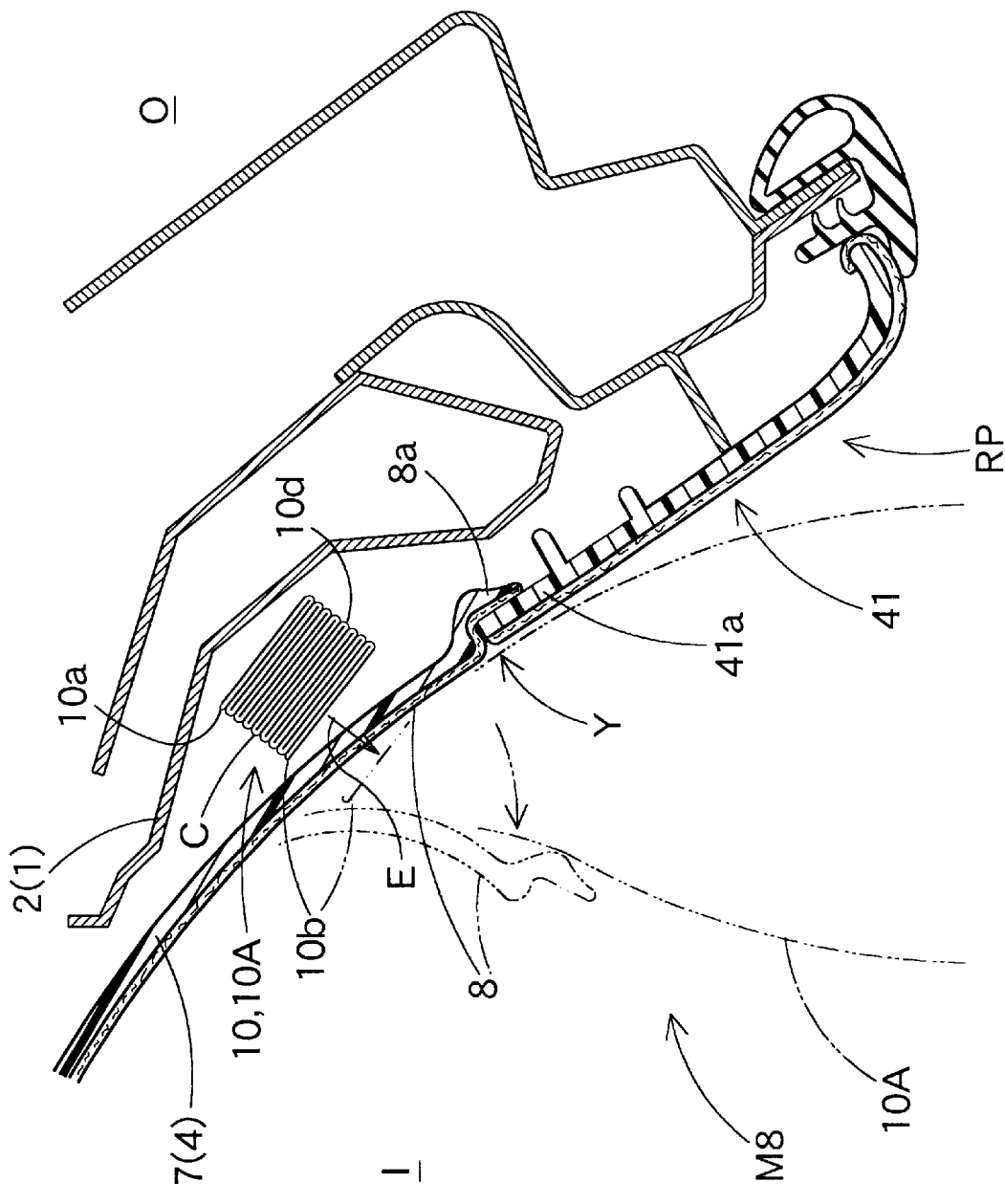
FIG. 29 is a schematic enlargement sectional view showing a use state of an eighth embodiment.
Figure 30:
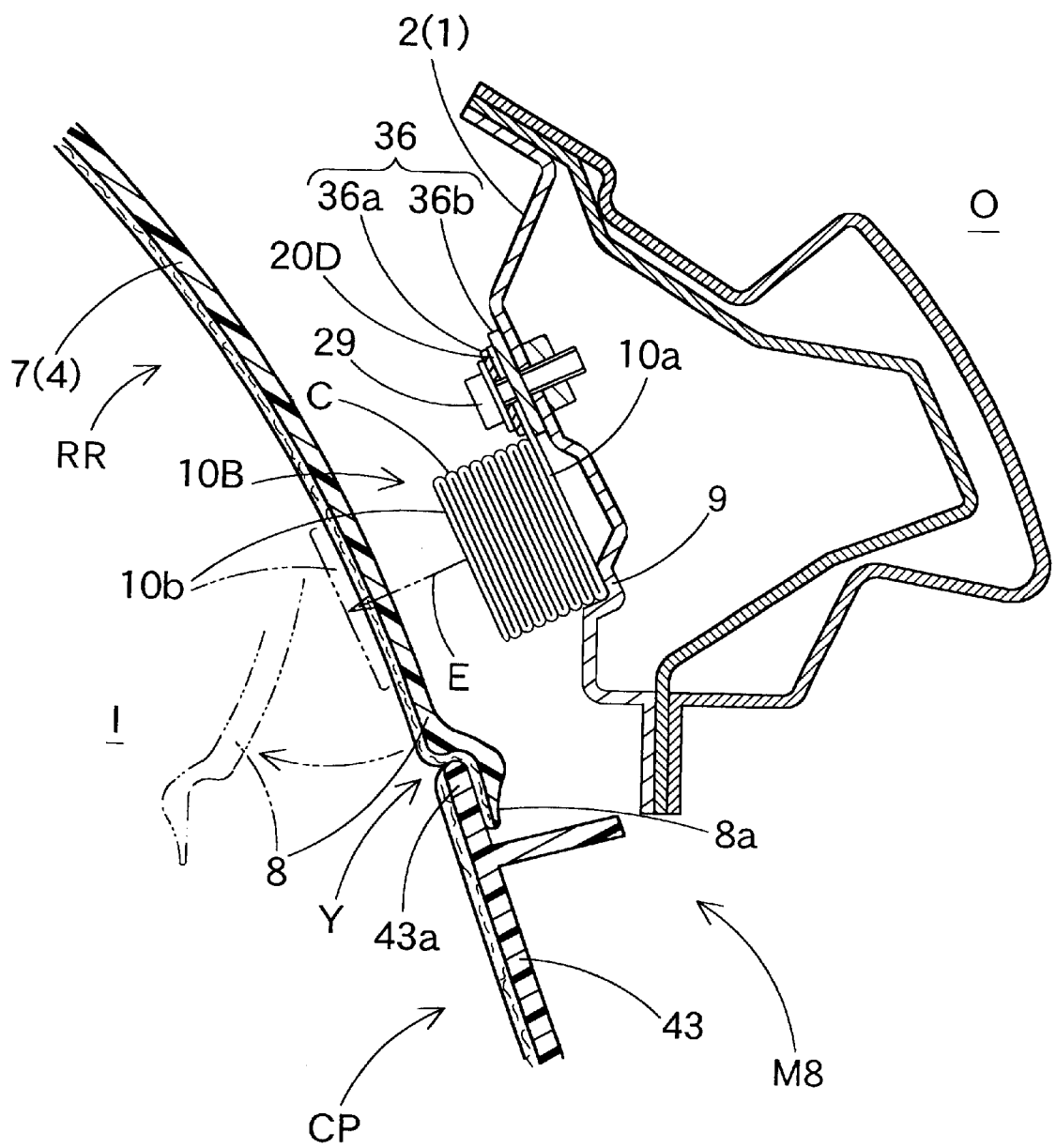
FIG. 30 is a schematic enlargement sectional view of another location showing a use state of the eighth embodiment.

When this air bag apparatus M8 is mounted in the vehicle, the side of the gas inflow portion 16 of the air bag 10 is in a twisted state, and together with the inflator 24, it is fixed to the inner panel 2. The tape member T1 is wound around the folded air bag 10, which maintains the folded state. Thus, as shown in FIG. 29, in the part 10A of the air bag, the state where it is twisted from the general part 10C can be maintained even if the restraining member 32 does not exist. On the other hand, the part 10B of the air bag is supported by a support member 9 extending from the inner panel 2 or the like even if the restraining member 37 does not exist, and the state where it is twisted from the general part 10C can be maintained.

Incidentally, the twist support member 9 may be provided at the side of the part 10A of the air bag. The support member 9 maybe provided integrally with the inner panel 2 and the outer plates 31b and 36b of the attachment brackets 31 and 36, or may be disposed as a member separate from those. Further, the support member 9 may be formed of a rupturable tape member. In this case, the twisted spiral part is wound by the tape member, which maintains the twisted state.

In this air bag apparatus M8, the parts 10A and 10B of the air bag are disposed at the positions where the lower end 8a of the lid is disposed at the vehicle's outer side of the pillar garnish upper ends 41a and 43a. The parts 10A and 10B of the air bag have a stronger force to push and open the lid 8 than the other general part 10C of the air bag. Thus, when the air bag 10 unfolds and expands, the lower end 8a of the lid is pushed by the parts 10A and 10B of the air bag and easily gets over the pillar garnish upper ends 41a and 43a. As a result, the air bag 10 quickly unfolds at the part of the pillar portions RP and CP. Accordingly, the whole of the air bag 10 smoothly unfolds and covers the opening W.

Figure 31:
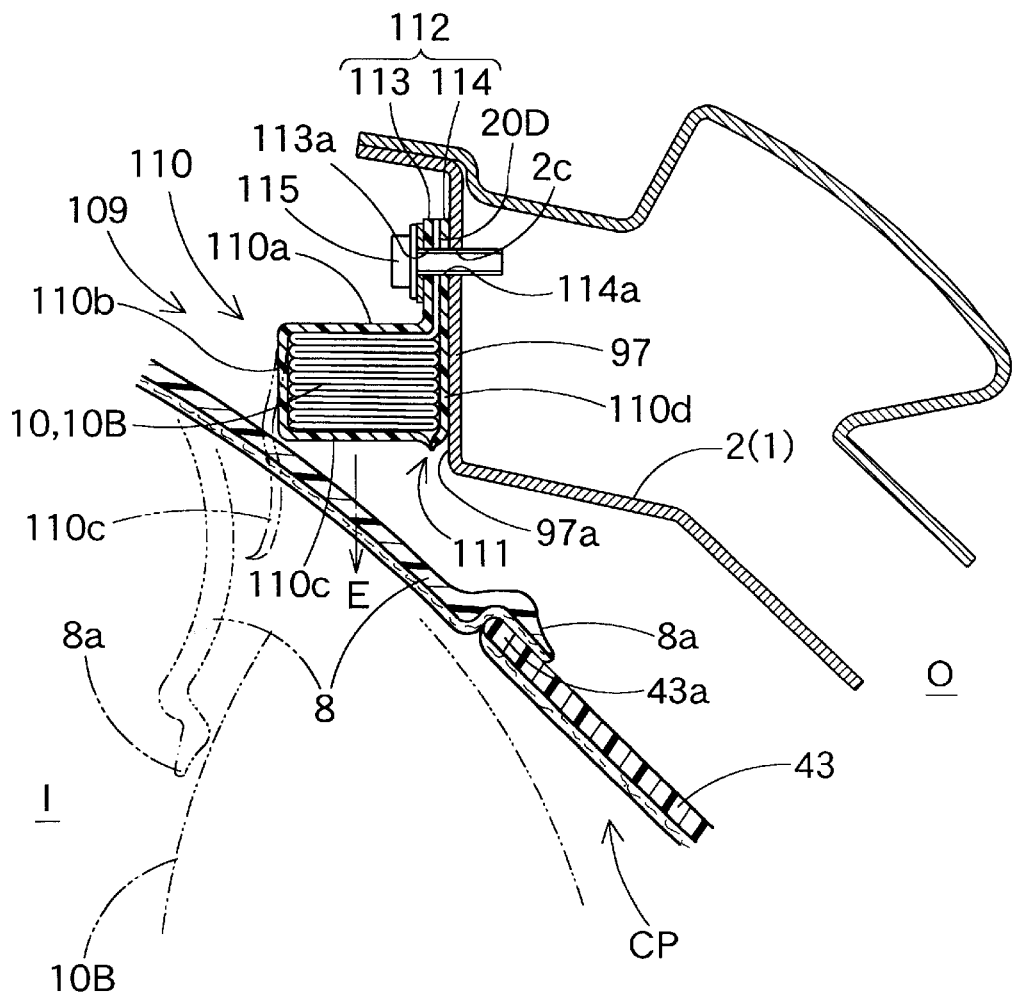
FIG. 31 is an enlarged sectional view showing a use state of a ninth embodiment.
Figure 32:
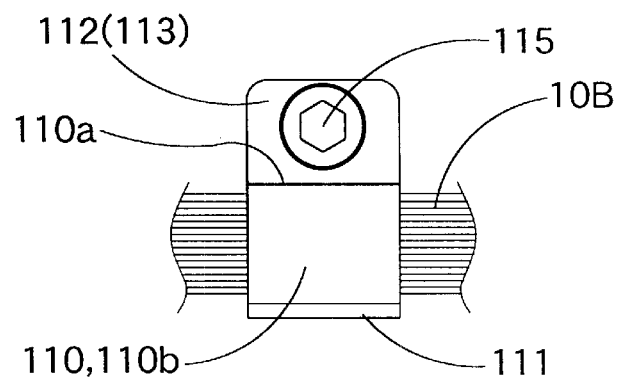
FIG. 32 is a front view showing a twist support member used for the ninth embodiment.

A band-like bracket 109 shown in FIGS. 31 and 32 may be used as the twist support member. This bracket 109 is made of synthetic resin such as polyamide, and includes a holding portion 110 of a substantially square tubular shape, and an attachment portion 112. The holding portion 110 includes an upper wall portion 110a, a vehicle's inner side wall portion 110b, a bottom wall portion 110c, and a vehicle's outer side wall portion 10d, and wraps the twisted air bag part 10B. A thin portion 111 expected to be ruptured is formed between a boundary part between the bottom wall portion 110c and the vehicle's outer side wall portion 110d. The attachment portion 112 is constituted by a single attachment part 113 extending upward from a vehicle's outer side end portion of the upper wall portion 110a, and a single attachment portion 114 extending upward from an upper end of the vehicle's outer side wall portion 110d. An attachment bolt 115 is inserted through attachment holes 113a and 114a and form in the attachment single portions 113 and 114. The attachment bolt 115 is fitted in a screw hole 2c of the inner panel 2, so that the single attachment portions 113 and 114 and an attachment portion 20D of the air bag 10 are attached to the inner panel 2.

In this bracket 109, the folded air bag part 10B is wrapped with the holding portion 110. The attachment portion 112 and the attachment portion 20D are attached to the inner panel 2 by using the attachment bolt 115, and the bracket 109 is attached to the inner panel 2. At the time of the attachment, the vehicle's outer side wall portion 110d of the holding portion 110 and the attachment single portion 114 are supported by a guide surface 97a of a restraining member 97, and the twisted state of the air bag part 10B is maintained.

In the air bag part 10B, the unfolding direction E, is made substantially orthogonal to the lid 8, and the unfolding direction E is directed to the side of the lid 8. Thus, when the air bag part 10B unfolds and expands, it expectedly ruptures portion 111 and projects from the holding portion 110 of the bracket 109. Further, the part 10B pushes the lid 8, and the lower end 8a of the lid easily gets over the pillar garnish upper end 43a.

Figure 33:
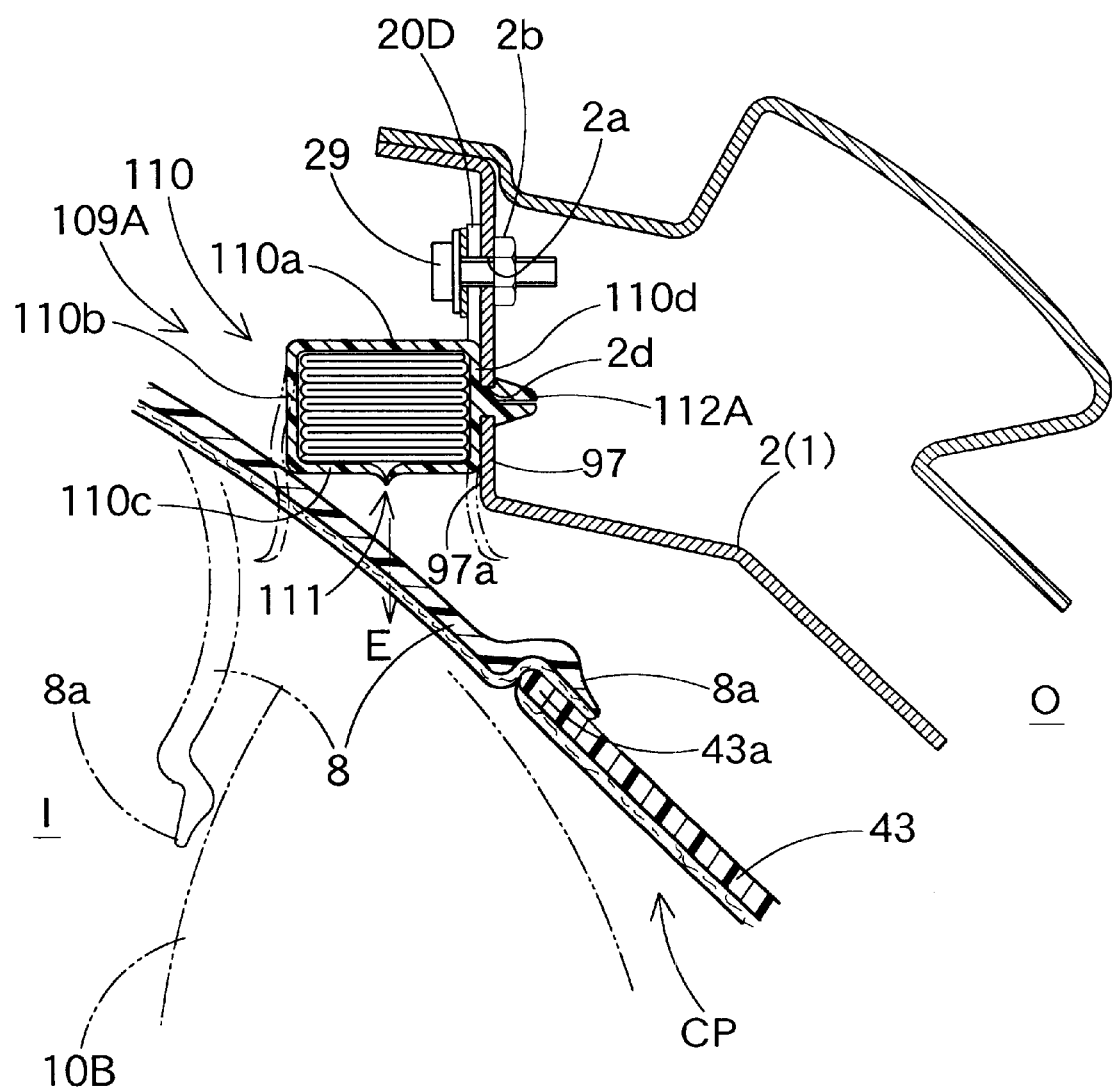
FIG. 33 is an enlarged sectional view showing a use state of a modified example of the ninth embodiment.

Incidentally, as the bracket 109, a bracket 109A of FIG. 33 may be used. This bracket 109A is also made of synthetic resin such as polyamide and is shaped into a band, and includes a holding portion 110 of a substantially square tubular shape and an attachment portion 112A. The holding portion 110 includes an upper wall portion 110a, a vehicle's inner side wall portion 110b, a bottom wall portion 110c, and a vehicle's outer side wall portion 110d, and wraps the twisted air bag part 10B. A thin portion 111 expected to be ruptured is formed at the center of the bottom wall portion 110c. The attachment portion 112A of the bracket 109A projects from the vehicle's outer side wall portion 110d to the vehicle's outer side O. This attachment portion 112A is inserted into an attachment hole 2d of an inner panel 2 (restraining member 97), and is fastened to the inner panel 2.

In this bracket 109A, the folded air bag part 10B is wrapped with the holding portion 110. The attachment portion 112A is fastened to the inner panel 2, and the bracket 109A is attached to the inner panel 2. At the time of the attachment, the vehicle's outer side wall portion 110d of the holding portion 110 is supported by a guide surface 97a of the restraining member 97, and the twisted state of the air bag part 10B is maintained.

In the air bag part 10B, the unfolding direction E is made substantially orthogonal to the lid 8, and the unfolding direction E is directed to the side of the lid 8. Thus, when the air bag part 10B is unfolded and expanded, it ruptures the portion 111 expected to be ruptured and projects from the holding portion 110 of the bracket 109A. Further, the air bag part 10B pushes the lid 8, and the lower end 8a of the lid easily gets over the upper end of the pillar garnish 43a.

What is claimed is:

1. An air bag apparatus, comprising:
   a moveable lid disposed in a folded state adjacent an interior upper edge of a vehicle window and adjacent an upper portion of a pillar;
   an air bag attached to the interior of the vehicle body, the air bag being arranged to push against and open the lid as the air bag deploys, the air bag including a lower edge, an upper edge, and an attachment portion disposed at the upper edge for attachment to the vehicle body,
   the air bag being folded so that the lower edge approaches the upper edge and the attachment portion is attached to the vehicle body so that the air bag is housed behind the lid,
   a portion of a lower end of the lid being retained by a portion of the interior trim on the pillar, and
   a portion of the air bag adjacent the lower end of the lid providing a focused and intensified force against the lid upon deployment, further comprising a restraining member, disposed at an upper position of the pillar portion, for preventing the air bag at the time of deployment from engaging the pillar trim,
   the restraining member includes a substantially L-shaped section including a vertical wall portion and a horizontal wall portion extending from a lower end of the vertical wall portion toward the vehicle's inner side,
   the air bag initially has a flat, unexpanded unfolded orientation that is folded in a bellows fashion in a substantially vertical direction from the lower edge toward the upper edge,
   the vertical wall portion supporting an outer side of the folded air bag,
   the horizontal wall portion supports a lower end of the folded air bag, and is disposed to form an acute intersection angle with the lid, and
   the portion of the air bag providing the focused and intensified force against the lid is constructed by forming an expanding portion at a narrow intersection between the lid and the horizontal wall portion.

2. An air bag apparatus according to claim 1, wherein the intersection angle between the horizontal wall portion and the lid ranges from abut 50° to about 80°.

3. An air bag apparatus, comprising:
   a moveable lid disposed in a folded state adjacent an interior upper edge of a vehicle window and adjacent an upper portion of a pillar;
   an air bag attached to the interior of the vehicle body, the air bag being arranged to push against and open the lid as the air bag deploys, the air bag including a lower edge, an upper edge, and an attachment portion disposed at the upper edge for attachment to the vehicle body,
   the air bag being folded so that the lower edge approaches the upper edge and the attachment portion is attached to the vehicle body so that the air bag is housed behind the lid,
   a portion of a lower end of the lid being retained by a portion of the interior trim on the pillar, and
   a portion of the air bag adjacent the lower end of the lid providing a focused and intensified force against the lid upon deployment, further comprising a restraining member disposed at an upper position of the pillar portion, for preventing the air bag at the time of unfolding and expansion from intruding into the vehicle's outer side of the pillar garnish, wherein
      the restraining member includes a substantially L-shaped section including a vertical wall portion and a horizontal wall portion extending from a lower end of the vertical wall portion toward the vehicle's inner side,
      the vertical wall portion supporting an outer side of the folded air bag,
      the horizontal wall portion supports a lower end of the folded air bag,
      the air bag is put in flat, non-expanded unfolded orientation that is folded in a bellows fashion in a fold substantially vertical direction from the lower edge toward the upper edge, and
      the portion of the air bag providing the focused intensified force to push and open the lid is constructed by disposing a tip end of the lower edge of the air bag to cover an upper portion of the folded air bag.

4. An air bag apparatus, comprising:
   a moveable lid disposed in a folded state adjacent an interior upper edge of a vehicle window and adjacent an upper portion of a pillar;
   an air bag attached to the interior of the vehicle body, the air bag being arranged to push against and open the lid as the air bag deploys, the air bag including a lower edge, an upper edge, and an attachment portion disposed at the upper edge for attachment to the vehicle body,
   the air bag being folded so that the lower edge approaches the upper edge and the attachment portion is attached to the vehicle body so that the air bag is housed behind the lid,
   a portion of a lower end of the lid being retained by a portion of the interior trim on the pillar, and
   a portion of the air bag adjacent the lower end of the lid providing a focused and intensified force against the lid upon deployment, further comprising a restraining member, disposed at an upper position of the pillar portion, for preventing the air bag at the time of deployment from engaging pillar, wherein
      the restraining member includes a substantially L-shaped section including a vertical wall portion and a horizontal wall portion extending from a lower end of the vertical wall portion toward the vehicle's inner side,
      the vertical wall portion supporting an outer side of the folded air bag,
      the horizontal wall portion supports a lower end side of the folded air bag, and
      the portion of the air bag providing the focused and intensified force against the lid is formed by the being folded so that a portion that is adjacent the vertical wall portion is expanded at the beginning of deployment.

5. An air bag apparatus according to claim 4, wherein the air bag includes an upstream side and a downstream side, and the portion of the air bag providing the focused and intensified force against the lid is formed so that the upstream side is disposed at the vertical wall portion, and the downstream side is disposed adjacent the lid.

6. An air bag apparatus according to claim 6, wherein the air bag is folded in a bellows fashion in which a fold is provided substantially at an intermediate position in a vertical direction from a flat unfolded state of the airbag so that the lower edge of the air bag is folded back toward the vehicle's interior, and it is folded substantially in the vertical direction from the lower edge of the air bag folded in half toward the upper edge, and the portion of the air bag providing the focused and intensified force against the lid is formed so that the upstream side is disposed at the upper edge of the air bag in a non-deployed, flat unfolded state, and the downstream side is disposed at the lower edge of the air bag.

7. An air bag apparatus according to claim 5, wherein the portion of the air bag providing the focused and intensified force against the lid includes, adjacent either the upper edge or the lower edge of the air bag, a projection portion projecting from the upstream side, and the projection portion is disposed at an end surface of the folded air bag adjacent the vehicle's exterior so that the projection portion faces the vertical wall portion of the restraining member.

8. An air bag apparatus according to claim 4, wherein the portion of the air bag providing the focused and intensified force against the lid includes an expansion portion into which the expanding gas can flow, and a non-expansion portion into which the expanding gas can not flow, a cut portion of the periphery of the air bag vertically bent towards the vehicle's exterior is provided at an edge of the expansion portion said cut portion disposed at an end surface of the folded air bag so that the cut portion faces the vertical wall portion of the restraining member.

9. An air bag apparatus, comprising:

a moveable lid disposed in a folded state adjacent an interior upper edge of a vehicle window and adjacent an upper portion of a pillar;

an air bag attached to the interior of the vehicle body, the air bag being arranged to push against and open the lid as the air bag deploys, the air bag including a lower edge, an upper edge, and an attachment portion disposed at the upper edge for attachment to the vehicle body, the air bag being folded so that the lower edge approaches the upper edge and the attachment portion is attached to the vehicle body so that the air bag is housed behind the lid, a portion of a lower end of the lid being retained by a portion of the interior trim on the pillar, and a portion of the air bag adjacent the lower end of the lid providing a focused and intensified force against the lid upon deployment, further comprising a restraining member, disposed at an upper position of the pillar portion, for preventing the air bag at the time of deployment engaging the pillar, wherein the restraining member includes a substantially L-shaped section including a vertical wall portion and a horizontal wall portion extending from a lower end of the vertical wall portion toward the vehicle's inner side, the vertical wall portion supporting an outer side of the folded air bag, the horizontal wall portion supports a lower end of the folded air bag, the air bag having a flat, unfolded orientation that is folded in a bellows fashion in a substantially vertical direction from the lower edge to the upper edge, the portion of the air bag providing the focused and intensified force against the lid is formed so that an upper side flow path is disposed at the upper edge side of the air bag and through which the gas for expansion can flow, and a lower edge side flow path which is disposed at the lower edge side of the air bag and through which the expanding gas can flow, and with the flow rate of expanding gas for expansion in the lower flow path being larger than the flow rate of expanding gas through the upper flow path.

10. An air bag apparatus, comprising:

a moveable lid disposed in a folded state adjacent an interior upper edge of a vehicle window and adjacent an upper portion of a pillar;

an air bag attached to the interior of the vehicle body, the air bag being arranged to push against and open the lid as the air bag deploys, the air bag including a lower edge, an upper edge, and an attachment portion disposed at the upper edge for attachment to the vehicle body, the air bag being folded so that the lower edge approaches the upper edge and the attachment portion is attached to the vehicle body so that the air bag is housed behind the lid, a portion of a lower end of the lid being retained by a portion of the interior trim on the pillar, and a portion of the air bag adjacent the lower end of the lid providing a focused and intensified force against the lid upon deployment, further comprising a restraining member, disposed at an upper position of the pillar portion, for preventing the air bag at the time of deployment from engaging the pillar garnish, wherein the restraining member includes a substantially L-shaped section including a vertical wall portion and a horizontal wall portion extending from a lower end of the vertical wall portion toward the vehicle's inner side, the vertical wall portion supporting an outer side of the folded air bag, the horizontal wall portion supports a lower end of the folded air bag, the portion of the air bag providing the focused and intensified force against the lid includes a flexible wrapping sheet covering the folded air bag, an upper end of the wrapping sheet being fixed to the upper edge of the air bag, a lower end of the wrapping sheet being wound around the inner side of the folded air bag and into contact with the horizontal wall portion of the restraining member, and further, the lower end side is inserted between folds of the folded air bag at the outer side of the folded air bag, and is held there between, and the wrapping sheet having front and back surfaces, the front surface being brought into contact with the horizontal wall portion, the front surface having a frictional resistance that is less than a frictional resistance of the back surface brought into contact with the air bag.

* * * * *